United States Patent [19]
van der Wal et al.

[11] Patent Number: 6,151,682
[45] Date of Patent: Nov. 21, 2000

[54] DIGITAL SIGNAL PROCESSING CIRCUITRY HAVING INTEGRATED TIMING INFORMATION

[75] Inventors: Gooitzen Siemen van der Wal, Hopewell; Michael Raymond Piacentino, Princeton; Michael Wade Hansen, Lawrenceville, all of N.J.

[73] Assignee: Sarnoff Corporation, Princeton, N.J.

[21] Appl. No.: 09/148,661

[22] Filed: Sep. 4, 1998

Related U.S. Application Data

[60] Provisional application No. 60/058,269, Sep. 8, 1997.

[51] Int. Cl.$^7$ .............................. G06F 1/12; G06F 13/42; H04L 5/00; H04L 7/00
[52] U.S. Cl. .......................... 713/401; 713/500; 327/149; 327/152; 714/700
[58] Field of Search .................................... 713/401, 400, 713/503, 300; 709/308; 714/815, 814, 700, 746, 775; 327/149, 152, 233; 326/93, 96; 360/26

[56] References Cited

U.S. PATENT DOCUMENTS

| | | | |
|---|---|---|---|
| 4,674,125 | 6/1987 | Carlson et al. | 382/49 |
| 4,691,294 | 9/1987 | Humpleman | 364/900 |
| 4,709,394 | 11/1987 | Bessler et al. | 382/49 |
| 4,760,542 | 7/1988 | Mehrgardt et al. | 364/724 |
| 4,916,659 | 4/1990 | Persoon et al. | 364/900 |
| 5,187,800 | 2/1993 | Sutherland | 395/800 |
| 5,359,674 | 10/1994 | van der Wal | 382/41 |
| 5,561,617 | 10/1996 | van der Wal | 364/724.05 |
| 5,640,525 | 6/1997 | Yumoto et al. | 395/377 |
| 5,819,075 | 10/1998 | Forsmo | 395/552 |
| 5,918,042 | 6/1999 | Furber | 395/559 |
| 5,982,827 | 11/1999 | Duffner et al. | 375/354 |

OTHER PUBLICATIONS

Lu, Shih–Lien, Implementation of Micropipelines in Enable/Disable CMOS Differential Logic, IEEE Transactions On Very Large Scale Integration (VLSI) Systems, vol. 3, No. 2, Jun. 1995, pp. 338–341.

*Primary Examiner*—Robert W. Beausoliel, Jr.
*Assistant Examiner*—Robert G. Crockett
*Attorney, Agent, or Firm*—William J. Burke

[57] ABSTRACT

Digital signal processing circuitry implemented in ASICs or FPGAs is built by combining multi-component constructs (e.g. macrocells). These circuits may be modified to include a timing channel by augmenting selected ones of the constructs to include a path which propagates a timing signal with a delay that compensates for the signal processing delay through the construct. The selected constructs are those that are used in a critical processing path in the digital signal processing circuitry. A timing compensation circuit may also be defined as a construct. This block receives two digital data signals having accompanying timing signals and delays the first signal that provides valid data until the second signal also provides valid data, as determined by their timing signals. A configurable arithmetic and logic unit (ALU) made using these techniques includes a timing compensation circuit, a look-up table and an accumulator. The configurable ALU may also include a timing signal selection circuit which selects between the each of two input timing signals, the logical AND of the input timing signals and the logical OR of the two input timing signals to produce an output timing signal. A programmable multiply-accumulator includes a matrix of multipliers, each of which may receive one of a plurality of input signals. The input signals are delayed through a pipeline and a portion of this pipeline is reserved for delaying one or more timing signals associated with the plurality of input signals. The delayed timing signals form the timing signals that are associated with the output signal of the programmable multiply accumulator.

9 Claims, 12 Drawing Sheets

DIGITAL SIGNAL PROCESSING CIRCUITRY HAVING INTEGRATED TIMING INFORMATION

This application claims the benefit of U.S. Provisional Application Ser. No. 60/058,269 filed Sep. 8, 1997.

The U.S. Government has rights in this invention under a contract DAAK70-93-C-0066.

BACKGROUND OF THE INVENTION

This invention relates to digital signal processing circuitry in which timing information is propagated with the processed signals and in particular to a method of implementing such circuitry in field programmable gate arrays (FPGAs) and application specific integrated circuits (ASICs).

Typically, special purpose digital signal processing circuitry is designed using either FPGAs or ASICs. The design methodology for these types of circuits is similar. The user specifies the operation of the circuit functionally, debugs the functional representation and then has the functional representation converted automatically or semi-automatically into a hardware implementation. The designer then massages the automatically generated hardware implementation to produce a circuit design which performs the desired function.

The circuitry in an ASIC is a combination of interconnected macrocells. Each macrocell represents a circuit element which may include multiple electronic components (e.g. transistors, resistors, capacitors). In addition, macrocells may be defined hierarchically so that multiple primitive macrocells may be combined to form a more complex macrocell. Once the design for an ASIC has been generated, it is converted into an actual circuit through a process that implements the individual components of each of the macrocells in the design as a single integrated circuit. Once an ASIC has been made, it is not possible to reconfigure its macrocells.

A circuit implemented in an FPGA, on the other hand, is designed by specifying interconnection of macrocells which may be formed from the gates on the gate array. A design implemented in an FPGA does not need to be specially fabricated, but may be simply programmed into the FPGA at power up using a serial programmable read only memory (PROM) or using a control interface such as that specified by the joint test action group (JTAG). The design in an FPGA may also change partially or fully during the course of an application. This is referred to as "reconfigurable logic" in the literature.

Digital designs implemented in ASICs, FPGAs and even random logic are prone to timing errors or time delays. These errors typically occur when a signal processed by one part of the circuit is combined with a signal processed by another part of the circuit. Due to timing differences on the input signals or propagation delays through the respective signal processing circuitry, the signals may not be properly aligned at the point in the circuit at which they are to be combined. These timing problems are typically resolved by inserting compensating delays at various locations in the circuitry such that the signals have the desired timing relationship when they are combined.

In U.S. Pat. No. 5,561,617 entitled PYRAMID PROCESSOR INTEGRATED CIRCUIT, an ASIC is described which propagates timing signals in parallel with the signal processing circuitry with delay adjustments to match the delay of the timing signals to the processing delays of the signal processing circuitry. The system described in this patent is a video signal processing system and the timing signals which are propagated with the video signals are the horizontal active (HA) and vertical active (VA) signals. These signals define times at which data representing active picture elements (pixels) are present in the video input and output signals. Active pixels are those which produce image information on a display device. By providing appropriately delayed timing signals along with the output signals, other functions in a system that follow the processor can be independent of the actual timing delay that occurred in the processor to obtain the appropriate results. Other advantages of including timing with the video data signals are: (a) active data only can be stored automatically, (b) control functions such as the length of line delays can be set automatically, (c) active data can be processed differently from non-active data, (d) boundary of image data can be processed differently from active data, (e) the process delay through a function can change as a function of processing parameters without effecting the control of other processing modules, and (f) the time interval between active data, i.e., horizontal blanking, could be variable to adjust for asynchronous data streams. The system described in this patent was implemented using compensating delay elements, having relatively long delay times, to pass the timing signals around complex signal processing circuitry. As a part of the design process, the time used to process the signals through this circuitry was determined, as part of the design process, so that the length of the compensating delay could be determined. Thus, while having the timing signal at the input and output of the ASIC aided in the use of the ASIC to implement more complex signal processing circuitry, there was no saving in design effort for the ASIC itself.

SUMMARY OF THE INVENTION

The present invention is embodied in a design method for use with ASICs and FPGAs. According to this method, individual macrocells, combinations of macrocells or other groupings of electrical components are associated with a corresponding delay element that delays timing signals and other signals relative to the signals which are being processed by the signal processing circuitry. The combination of macrocells and delay elements are defined as auxiliary macrocells. Signal processing circuitry may be designed by combining these auxiliary macrocells in the same way that the original macrocells would have been combined to form the signal processing circuitry.

According to one aspect of the invention, a data alignment circuit is provided which receives two input signals and their associated timing signals. When only one of the two signals has valid data, as indicated by the timing signals, the data alignment circuit stores samples of the signal until the other signal is found to provide valid data. When both input signals provide valid data, the data alignment circuitry may either provide both of the signals at the same time or delay one signal by a predetermined amount with respect to the other signal.

According to another aspect of the invention, a configurable arithmetic and logic unit is implemented as a combination of a data alignment circuit, a look up table, and an accumulator. The configurable ALU interfaces with a digital signal processor (DSP) for control.

According to another aspect of the invention, the configurable arithmetic and logic unit includes a timing signal selection circuit which may select either of two input timing signals, the logical AND of the input timing signals or the logical OR of the input timing signals to provide as an output timing signal.

According to yet another aspect of the invention, a programmable multiply accumulator circuit is provided which includes a matrix of multiply-accumulate circuits that may be used as multiply-accumulators or as a combination of multipliers. A single delay path is provided to generate the compensated timing signals for all of the output signals provided by the multiplier matrix. When less than all of the multipliers in a signal processing path are used to produce an output signal, a multiplexer is used to select a delayed timing signal that is appropriate for the output signal.

DETAILED DESCRIPTION

The present invention is described in terms of video signal processing circuitry. It is contemplated, however, that it may be used with any circuitry that processes signals for which timing information may be conveyed as a signal in parallel with the signal that is being processed.

In the exemplary embodiment of the invention, the video data is presented in a fixed format. The video data stream consists of successive 10-bit words representing successive image pixels, these 10-bits are allocated as follows:

Bits [7:0]=8-bit video data.

Bit [8]=vertical (VA) timing signal. This signal is active during the entire time that the active video data is present on bits [7:0] for each image or frame or field of the video data stream.

Bit [9]=horizontal (HA) timing signal. This signal is active while active pixel data for a specific line exists in the 8-bit video data stream.

The signal VA is typically used only when successive image fields or successive image frames are being processed. If data in a single video image is processed, the signal HA or the logical AND of the signals HA and VA may provide all of the timing information that is needed.

The inventive design methodology adds to the macrocells or other component constructs used in designing with ASICs and FPGAs, augmented macrocells and constructs. As used herein, the term macrocell includes any component construct which may be used to form other constructs in the implementation of an ASIC or a Programmed FPGA. Each of these augmented constructs includes a timing channel in addition to the data channel. Signal processing circuitry is designed using these augmented constructs by assembling the augmented constructs in the same way as the conventional constructs would be assembled. In a sequence of processing steps, the output signals provided by the delay channel of one construct are applied as the input signals to the delay channel of a subsequent construct. When this methodology is followed, at least along the critical path through the digital signal processing circuitry, the processed output signal is available with timing signals that indicate when the processed data is valid and invalid.

Designs implemented using ASICs and FPGAs are typically synchronized to a clock signal. This is accomplished by inserting clocked latch elements into the design. Some of the macrocells that are defined within the macrocell library of an ASIC or an FPGA include these clocked latch elements. Other macrocells do not include the latch elements and the compiler or the designer must insert latch elements at appropriate locations in the circuit to synchronize the processing of the signals.

Figure 1A:
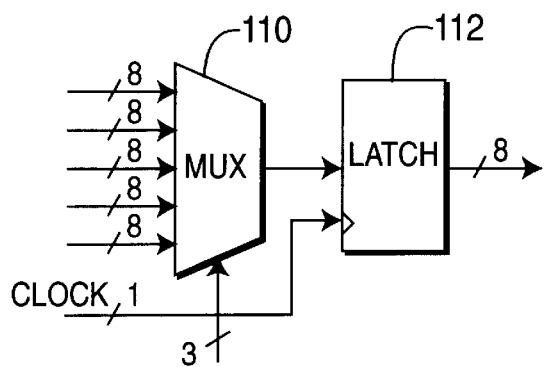
FIG. 1A (prior art) is a block diagram which illustrates a possible implementation of a multiplexer macrocell for use in designing with FPGAs or ASICs.
Figure 1B:
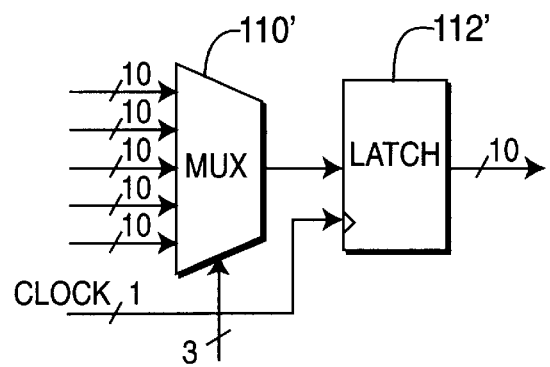
FIG. 1B is a block diagram of the multiplexer macrocell shown in FIG. 1A modified according to the present invention.
Figure 2A:
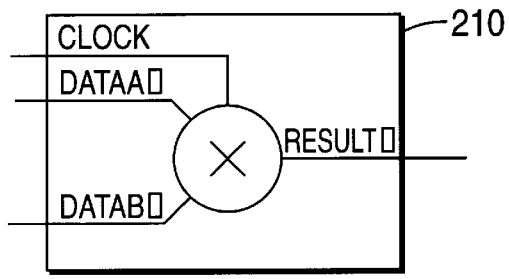
FIG. 2A is a block diagram of a multiplier macrocell which may be used when designing circuits with ASICs or FPGAs.
Figure 2C:
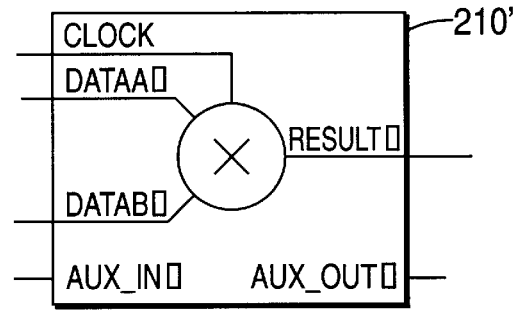
FIG. 2C is a diagram of the icon for the auxiliary multiplier macrocell.
Figure 2B:
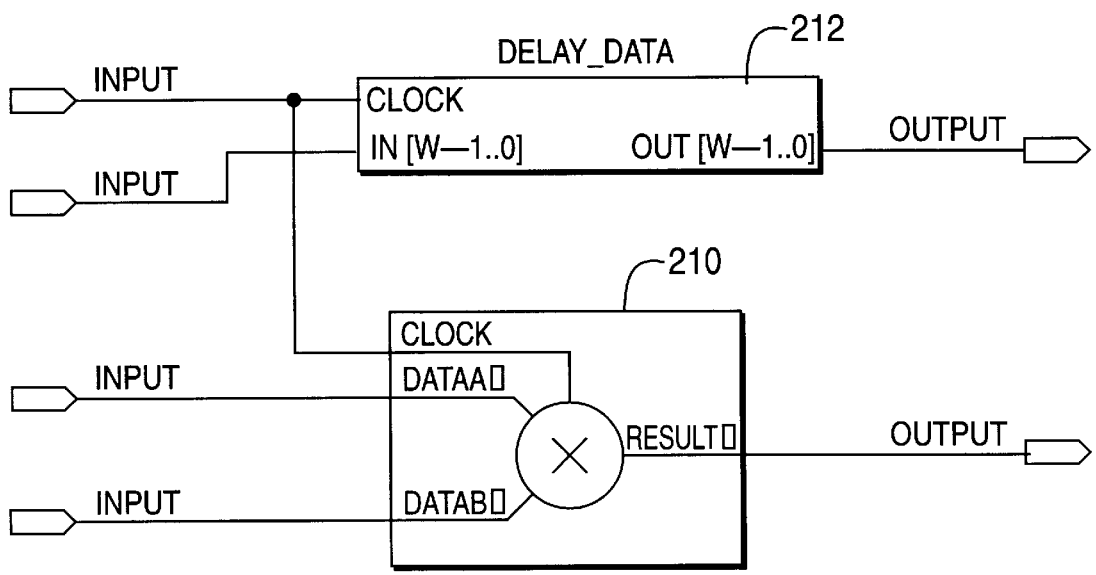
FIG. 2B is a block diagram of the multiplier macrocell shown in FIG. 2A modified according to the present invention.

As described below with reference to FIGS. 9A through 9C, this design methodology allows complex signal processing systems to be inserted into or deleted from a design without the need to specifically compensate for changes in signal processing delays. In this exemplary implementation of the present invention, three types of augmented constructs are defined for changing macrocells and other constructs used in the design of ASICs and programmed FPGAs. These constructs are illustrated by FIGS. 1A and 1B; FIGS. 2A through 2C; and FIGS. 3A through 3D.

The most basic augmentation is to simply treat the timing signals as extra bits in the data and pass these signals through the same circuitry which processes the data signals. This method of augmentation is appropriate when the signal processing consists of delaying or switching the signals but does not change data values. An example of this is shown in FIGS. 1A and 1B.

FIG. 1A is a block diagram of an exemplary multiplexer macrocell which may be used in the design of an ASIC or a programmed FPGA. The exemplary macrocell includes a 5-input multiplexer 110. Each input port of the multiplexer conveys 8-bits of data. The exemplary multiplexer macrocell also includes an 8-bit latch 112 which is responsive to the signal CLOCK to store the data values provided by the multiplexer. The multiplexer is responsive to a 3-bit selection signal to pass one of the 5 input signals to its output port. Latch 112, responsive to the signal clock, periodically stores the output signal provided by the multiplexer 110. Latch 112 is used to synchronize the signal provided by the multiplexer to other signals in the signal processing circuitry.

An exemplary augmented multiplexer is shown in FIG. 1B. As shown in FIG. 1B, the augmentation consists of expanding each of the data paths from 8-bits to 10-bits, the additional 2 bits being the timing signals HA and VA described above. With this augmentation, an application using the data provided by the latch 112' may know whether the data values are valid or invalid by simply examining the signals HA and VA.

A more complex augmentation is illustrated in FIGS. 2A and 2C. FIG. 2A is a block diagram of an exemplary multiplier macrocell that may exist in the macrocell library used in ASIC or FPGA design. This macrocell defines a multiplier having a dataa input port, a datab input port and a clock terminal. Results of the multiplication are provided at an output port, result. According to the exemplary invention, the multiplier circuit shown in FIG. 2A may be augmented as shown in FIG. 2B by adding a delay element 212 parallel with a multiplier 210. In FIG. 2B, the delay element 212 is shown in general terms as having a width of W bits. In an implementation in which only the timing signals are to be conveyed through the delay element, W would be equal to 2. It may be desirable, however, as described below with reference to FIG. 9C, to pass other signals through the delay element with the timing signals.

In the exemplary augmented circuit shown in FIG. 2B, the length of the delay provided by the delay element 212 is substantially the same as the processing delay through the multiplier 210. This delay value is typically specified in the macrocell library or may be specified by the designer. The exemplary augmented multiplier circuit assumes that the signals applied to the inputs dataa and datab of the multiplier 210 are aligned in time such that the timing signal associated with either one of the input signals signal may be conveyed through the delay element 212 to produce the output timing signal. As described below with reference to FIG. 3C, it is contemplated that the timing signal may be selected from among either of the input timing signals, the logical AND of the two input timing signals or the logical OR of the input timing signals.

FIG. 2B illustrates the design of the augmented multiplier, in the ASIC or FPGA macrocell library. The augmented multiplier, however, may also be represented in the macrocell library as the icon 210' shown in FIG. 2C.

Figure 3A:
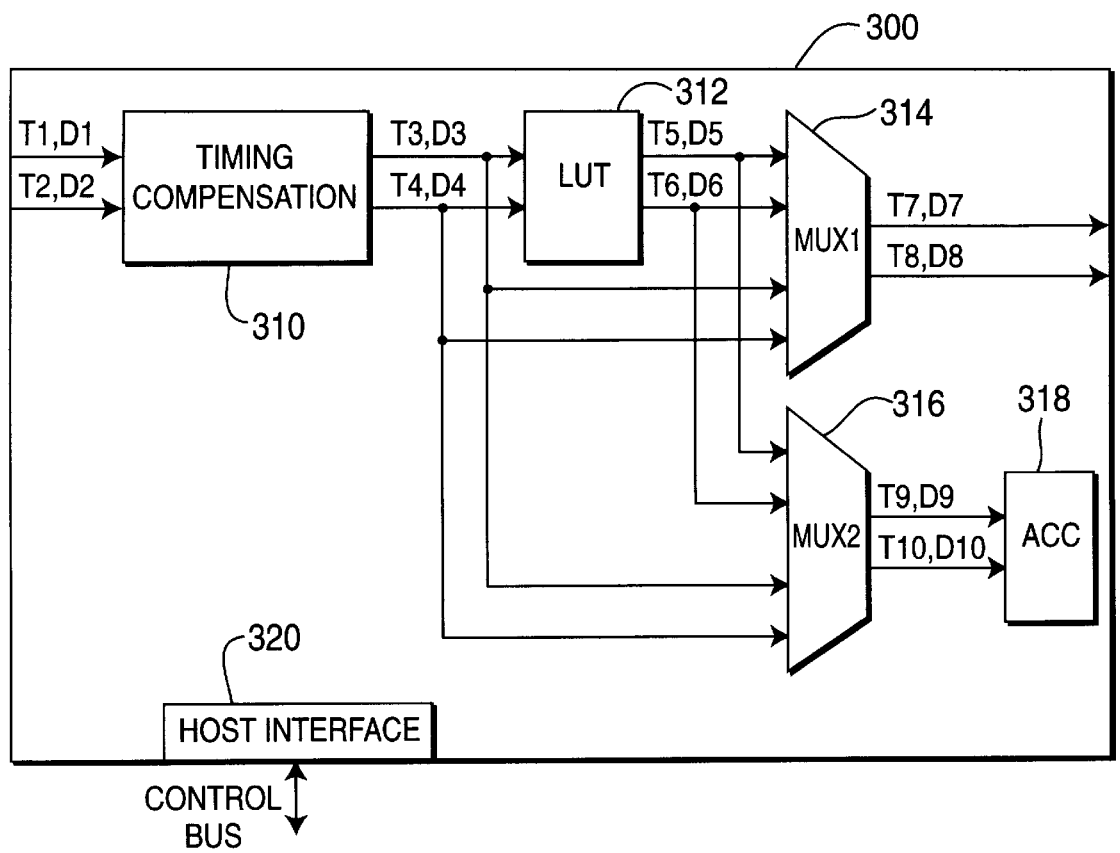
FIG. 3A is a block diagram of a configurable arithmetic and logic unit (ALU) according to the present invention.
Figure 3B:
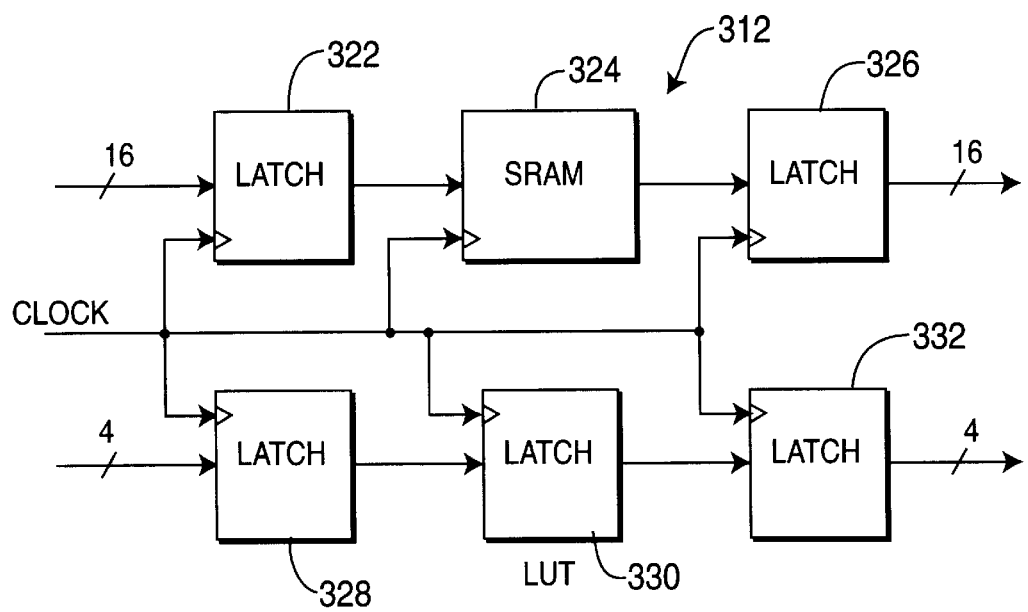
FIG. 3B is a block diagram which illustrates an exemplary circuit suitable for use as the look up table shown in FIG. 3A.

FIGS. 3A through 3E illustrate an exemplary signal processing circuit implemented using the techniques described above plus an additional technique: a timing compensation to align two input signals. The circuit shown in FIG. 3A is a configurable arithmetic and logic unit 300. The circuit 300 receives two input signals D1 and D2 each having a corresponding timing signal T1 and T2. The input signals are applied to timing compensation circuit 310 (described below with reference to 3D). Timing compensation circuit 310 senses the states of the timing signals T1 and T2 to determine when each of the respective data signals, D1 and D2 is valid. When one of data signal is providing valid data while the other data signal is not yet valid, the timing compensation circuit 310 stores the valid data until the signals T1 and T2 indicate that both data signals are valid. When both of the received signals are valid, the timing compensation circuit 310 provides the data values and corresponding timing values to a look up table 312 and to multiplexers 314 and 316. As described below with reference to FIG. 3B, look up table 312 may be programmed to implement any of a number of monadic or dyadic operations on the input data. Because the data is processed by the look up table 312, timing signals are passed around the look up table through a parallel delay circuit as illustrated in FIG. 3B.

Either the time aligned input data provided by the timing compensation circuit 310 or the processed data provided by the LUT 312, may be provided as an output signal of the configurable ALU 300 via the multiplexer 314. As shown in FIG. 3A, the output signals of the multiplexer 314 are the data signal D7 and the associated timing signal T7 and the data signal D8 and its associated timing signal T8. Alternatively, the output signals provided by the LUT 312 or the output signals provided by the timing compensation circuit 310 may be applied to the accumulator 318 via the multiplexer 316. The timing signals are used to accumulate only the active part of the data. The accumulator 318 is controlled through a host interface 320 from a control bus which couples the configurable ALU to a digital signal processor (DSP) (not shown).

In the exemplary embodiment of the invention, the host interface 320 is also used to program the LUT 312 with the appropriate function to be implemented by the configurable ALU 300. Using this interface, the function performed by the ALU may be changed dynamically and complex functions of a pair of 8-bit values or of a single 8- or 16-bit value may be readily implemented.

FIG. 3B is a block diagram which shows details of the exemplary look up table 312. As shown in FIG. 3B, a 16 bit input address value is applied to an address latch 322. The latch, in turn, provides the address values to a static random access memory (SRAM) 324. Responsive to a clock signal applied to its clock input port, the SRAM 324 provides the data stored at the addressed location to an output latch 326. Latch 326, in turn, provides the output data from the look up table 312. As shown in FIG. 3B, the exemplary LUT 312 has a delay of 3 clock periods. One clock period for loading the address data into the latch 322. One clock period for accessing the addressed information from the SRAM 324 and one clock period for storing the output data into latch 326. Thus, a compensating delay for the timing signals of the data that is processed by the LUT 312 includes 3 latches 328, 330 and 332 which are coupled to receive the same clock signal as is received by the latches 322 and 326 and the SRAM 324. The delay path through the latches 328, 330 and 332 is 4 bits wide to accommodate the HA and VA signals for both of the 8-bit input values. Accordingly, at the output port of the LUT 312, the 16-bit data value port corresponds to two 8-bits values and the 4-bit timing signal corresponds to two respective 2-bit timing signals.

Figure 3C:
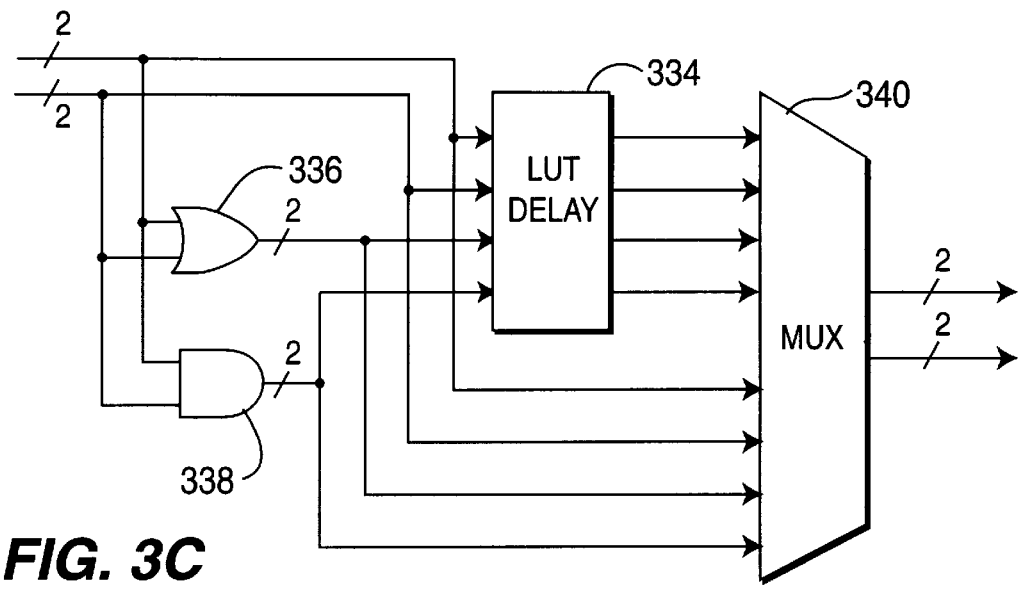
FIG. 3C is a block diagram of a timing signal selection circuit suitable for use with the configurable ALU shown in FIG. 3A.

FIG. 3C illustrates an alternative implementation for the timing signal compensation used by the configurable ALU shown in FIG. 3A. In this alternative implementation, the two 2-bit timing signals from the two data input signals are applied directly to the LUT delay element 334, which may, for example, includes the latches 328, 330 and 332. The two 2-bit timing signals are also applied to a multiplexer 340. The two bit timing signals from each of the input data signals are also applied to a pair of OR gates 336 and a pair of AND gates 338. The OR gates 336 generate the logical OR of the respective HA and VA timing signals provided by the timing compensation circuit 310. The AND gates 338 similarly form the logic AND of these timing signals. The functional meaning of the logical OR and the logical AND operation on the timing signals may be as follows. If the timing signals define a rectangular region and the difference in timing between the two input channels represents a shift in horizontal and vertical direction, then a logical OR defines a new rectangular region that includes both input regions and a logical AND defines a new rectangular region that is the intersection of the two input regions. The input signals to the multiplexer 340 include the timing signals provided by the timing compensation circuit 310, the delayed timing signals provided by the compensation circuit 310, the delayed logical OR and logical AND of the timing signals provided by the circuit 310 and the underlayed logical OR and logical AND of the signals provided by the timing circuit 310. One or two of these pairs of timing signals may be selected, responsive to a control signal provided by the external DSP (not shown), to the multiplexer 340. In this configuration, the circuitry shown in FIG. 3C may be adapted to provide timing signals having the delay of the timing signal shown in FIG. 3B or other alternative timing signals.

Figure 3D:
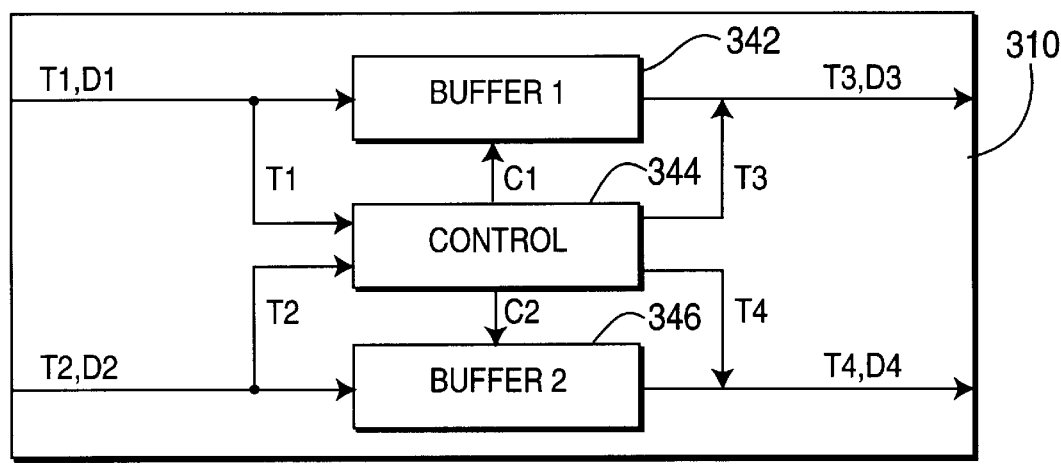
FIG. 3D is a block diagram of an exemplary timing compensation circuit shown in FIG. 3A

FIG. 3D is a block diagram which illustrates the timing compensation module 310 shown in FIG. 3A. In this circuit, the two 10-bit input signals which include two 8-bit data values (D1, D2) and two respective 2-bit timing signals (T1, T2) are applied to respectively different buffers 342 and 346. In the exemplary embodiment of the invention, the buffers 342 and 346 maybe implemented as first-in-first-out (FIFO) memories. The data signals are applied to the buffers while the timing signals T1 and T2 are applied to control circuitry 344.

The control circuitry 344 may, for example, form the logical AND of the HA and VA timing signals associated with each of the data signals to form a single data valid signal for each of the data signals D1 and D2. The data valid signals may control the respective write clock signal in each of the FIFOs 342 and 346. The two data valid signals may then be combined in a logical AND circuit to generate a signal which controls the read clock signals of the FIFO 342 and 346. In this configuration, when one of the data signals D1 and D2 is valid, its data is stored into the corresponding buffer 342 or 346. Data is not read from the buffers 342 and 346, however, unless both of the signals D1 and D2 are valid. As shown in FIG. 3D, the timing signals T3 and T4 which represent the output timing signals of the timing compensation module 310 may be generated in the control circuitry 344. Alternatively, the width of the buffers 342 and 346 may be increased to accommodate the timing signals and the timing signals may be propagated through the buffers with the respective data signals D1 and D2.

The control circuitry 344 may also be controlled by the external DSP to impose a fixed delay between the output data signals D3 and D4. In this alternative implementation, the external DSP may provide the control circuitry 344 with a number of clock cycles for which to delay one of the data signals with respect to the other. Once both data valid signals are asserted, the exemplary control circuitry 344 would immediately issue read clock pulses to one of the FIFOs 342 and 346 but delay the issuance of read clock signals to the other of the buffers 342 and 346 until the specified number of delay clock cycles have passed.

Figure 3E:
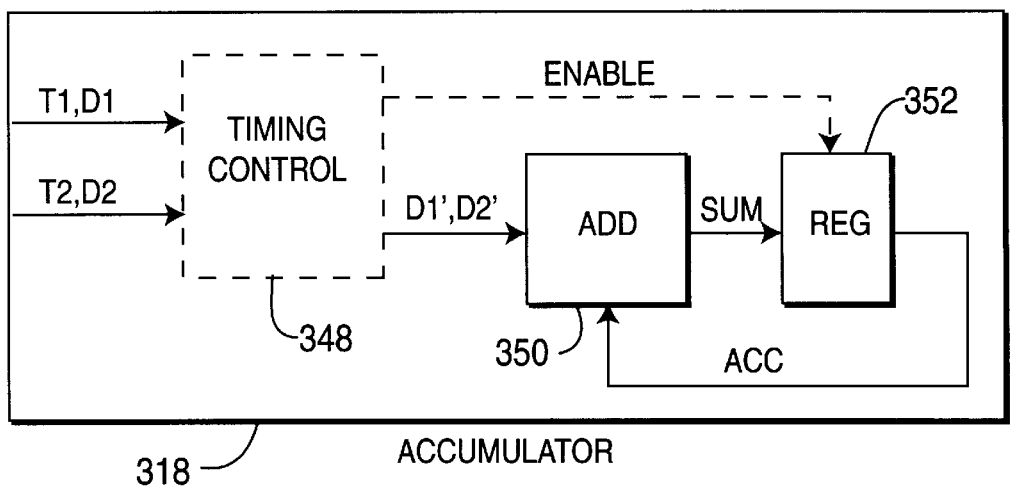
FIG. 3E is a block diagram of an exemplary accumulator circuit shown in FIG. 3A.

FIG. 3E is a block diagram of an exemplary accumulator circuit 318 which may be used in the configurable ALU shown in FIG. 3A. In the circuitry shown in FIG. 3E, the input signals with their associated timing signals are applied to an optional timing control circuit 348. The timing control circuit 348 may be the same as the timing compensation module 310 shown in FIG. 3D, except that there is no need to provide output timing signals since the accumulator 318 does not provide a steady-state output signal. The accumulator 318 merely accumulates a running sum which is read by the external DSP.

In the exemplary embodiment of the invention, the input signals of the accumulator, D1 and D2, or the output signals D1' and D2' of the timing control circuit 348 are applied to one input port of an adder 350. The exemplary adder 350 may be adaptively configured by the external DSP as two 8-bit adders or as one 16-bit adder. Output values from the adder 350 are stored in a accumulator register 352. The value stored in the accumulator register 352 is applied to the other input port of the adder 350. This would automatically accumulate only the valid data as defined by the timing signals. When the optional timing control circuitry 348 is used, the logical AND of the two data valid signals may be used as an enable input signal to the accumulator register 352, to allow the register 352 to begin to accumulate the sums provided by the adder 350. If, however, the timing control circuitry 348 is not used and some external means such as timing compensation module 310 is used to align the data signals D1 and D2, the register 352 may be always enabled, or may be enabled by an externally supplied timing signal. In either case, the accumulator register 352 may be reset by the external DSP after the accumulated data value has been read or may be reset by the start of the VA signal (beginning of an image in a video sequence).

Figure 4:
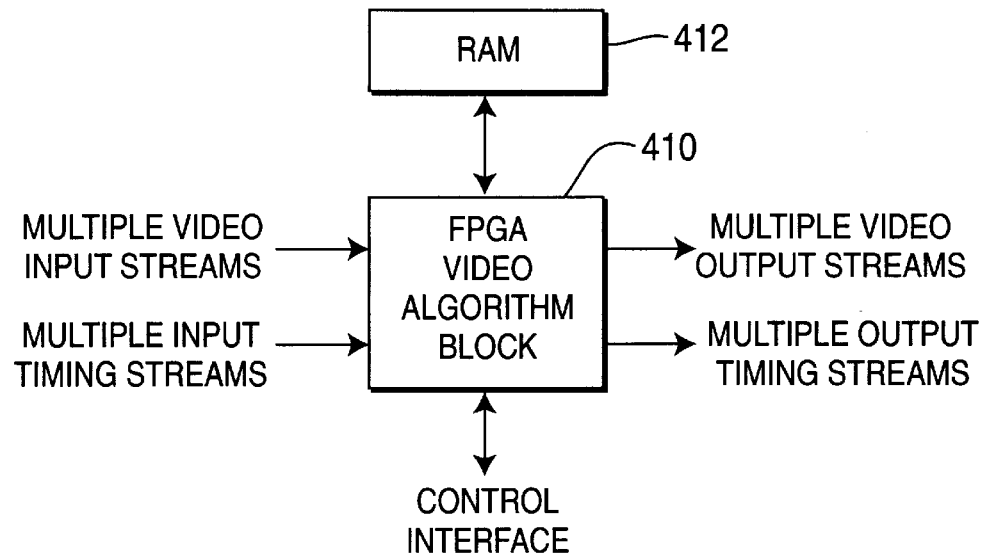
FIG. 4 is a block diagram which illustrates the basic structure of an FPGA signal processor according to the present invention.

FIG. 4 is a block diagram of an exemplary FPGA in a configuration which may be used to implement signal processing circuitry according to the present invention. As shown in FIG. 4, this configuration includes an FPGA 410 and a random access memory (RAM) 412. The FPGA 410 is defined to receive one or more input video streams and to provide zero, one or more output video signals. Each of the input and output video signals has associated timing signal (s). Finally, the FPGA has a control interface by which it may be reconfigured and through which it may be controlled during signal processing operations.

A key feature of the video-processing block in FIG. 4 is the pipelined nature it presents. Because video processing algorithms may be implemented as a pipelined set of hardware processes, the internal delays within the FPGA's becomes less critical. Unlike in control loop design where signal generation times are very critical, in video processing the key concern is to provide wide data paths with high throughput. The actual timing or latency of the data within the FPGA is not as important as the overall delay from the input port to the output port. In addition, due to the pipelined nature of these FPGA designs, relatively complex functions such as floating point divides become possible, assuming a sufficient number of pipelines are inserted to distribute the delays of these functions.

Figure 5:
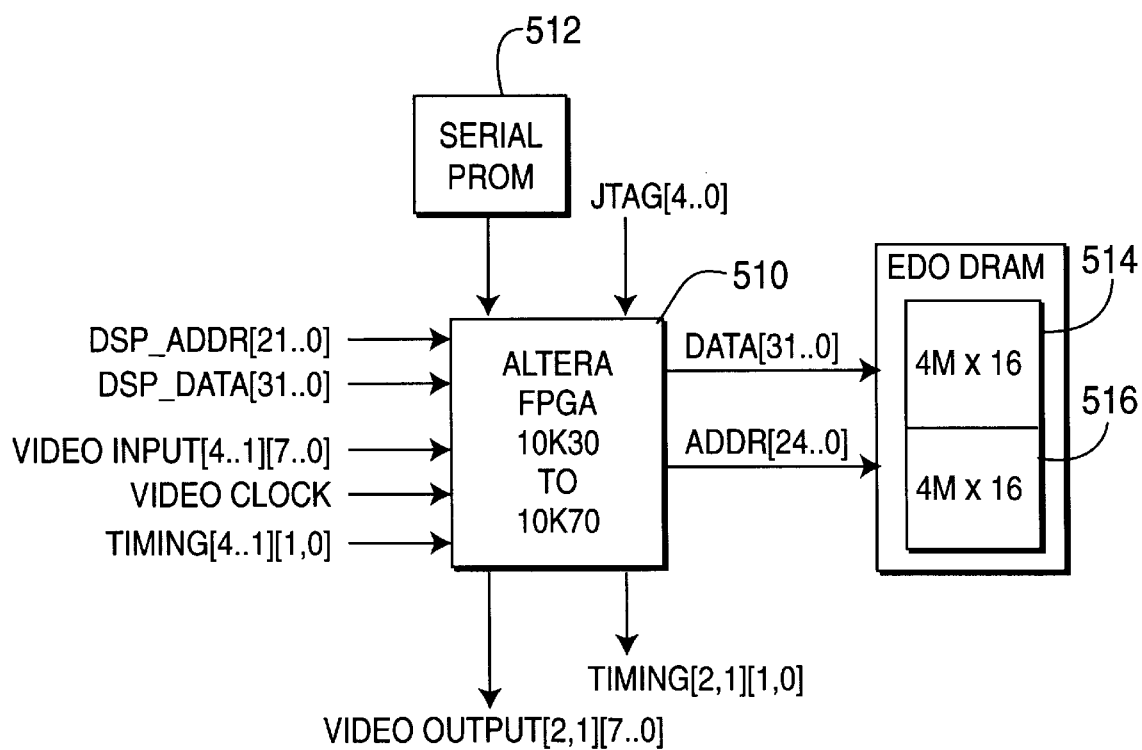
FIG. 5 is a block diagram which shows further details of the general FPGA signal processor shown in FIG. 4.

As shown in FIG. 5, the exemplary video processing block consists of one FPGA 510, one serial FPGA configuration PROM 512 and two-DRAM memory devices, 514 and 516. The exemplary FPGA 510 and the serial PROM 512 are Altera devices and may be any device from a 10K30 to a 10K250. For a simple comparison the 10K30 equates to about 30,000 gates while the 10K250 equates to about 250,000 gates. The 10K30 have about 1.2 Kbytes of internal RAM while the 10K250 has about 40Kbytes. The internal RAM can be used as FIFOs, cache, or just data registers. For larger additional memory storage the exemplary video processing block has access to up to 4M×32 EDO DRAM. The purpose of the DRAM 514 and 516 is to provide a location for image data to be stored. The data placed in DRAM may be data processed by the video processing block or it may be data stored while the DRAM 514 and 516 are being used as an image frame store.

Figure 6:
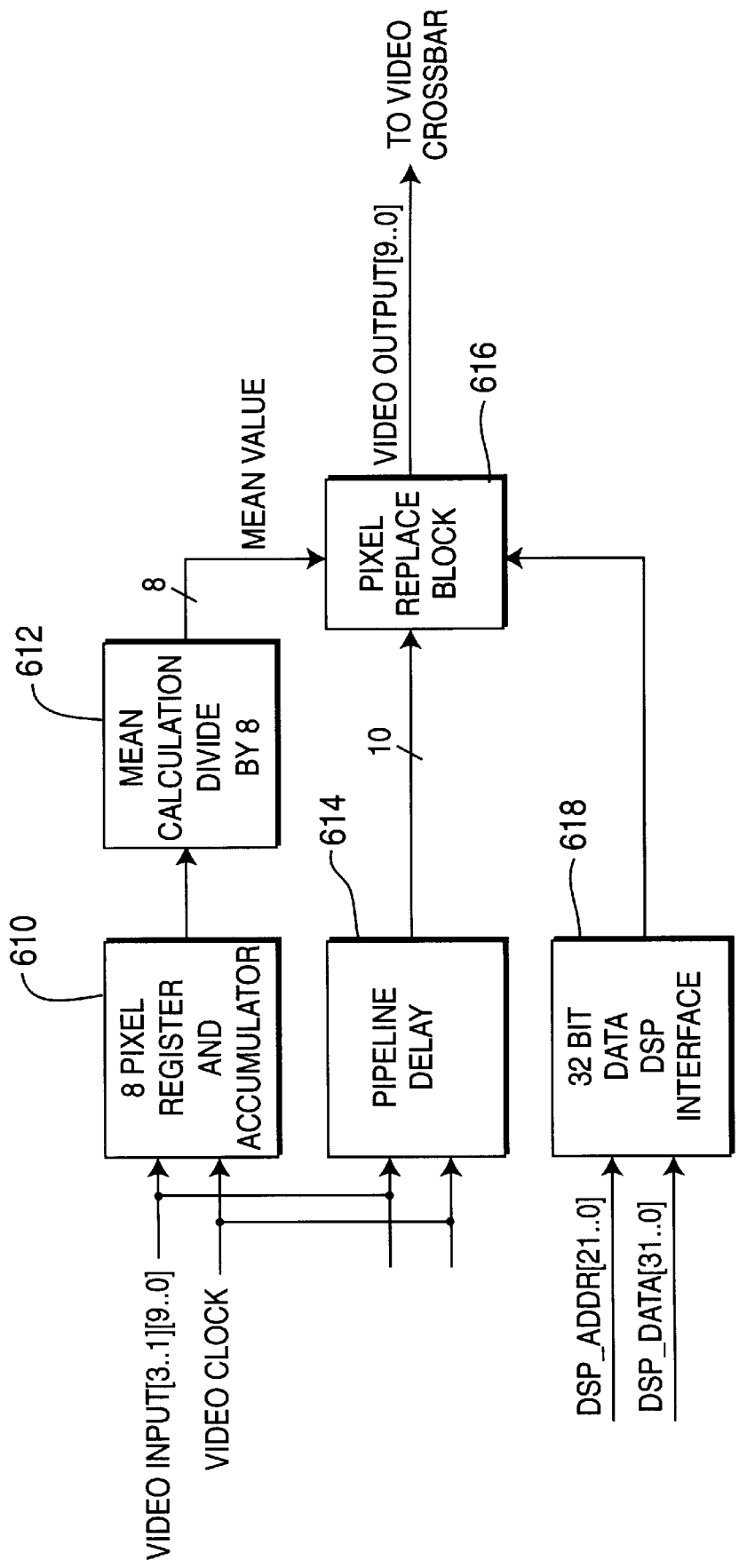
FIG. 6 is a block diagram of a sigma filter implemented using the FPGA signal processor shown in FIGS. 4 and 5.

The video processing block may be configured in many ways as illustrated below. In one configuration, the video processing block 510 may be configured as a 3×3 sigma/mean filter as shown in FIG. 6. Mean filters are typically used to smooth out the response of an image, for example to replace the noisy pixels. One area in which sigma/mean filters are useful is when an image contains a large number of outlier pixels. Outlier pixels are those pixels with value that are out of the range of normal operation. The general concept of the sigma/mean filter is to consider a unique pixel and compare it to the mean of its neighboring pixels. If the mean of the neighboring pixels is much different than the pixel of interest then the pixel of interest is replaced by the mean of its neighbors. The means for determining the difference between the individual pixel and the mean of the neighboring pixels is programmable.

The mean filter input register block 610 in the sigma/mean filter algorithm is responsible for gathering the eight neighboring pixels around the pixel of interest. As this block gathers the pixel values it also accumulates their sum which is used in the mean calculation. The exemplary accumulator may be a general eight bit unsigned adder with an output bus that can accommodate up to eleven bits.

Within the mean calculation block 612, the mean value of the eight neighboring pixels is calculated using the accumulated sum of the neighboring pixels. To calculate the mean value of the eight neighboring pixels a the binary value of the accumulated sum from the previous block is shifted right by three, in effect dividing by eight.

The accumulated sum from the previous block is an eleven bit binary number. By shifting the result of the accumulator to the right by three bits (>>3) the result may be used as the mean of the pixel of interest.

The pixel of interest pipeline block 614 is used to keep the pixel of interest synchronized to the calculation of the mean value of its neighboring pixels. The processing performed in the blocks 610 and 614 benefit from the introduction of several pipeline delays. The first register block inserts a single clock pipeline while the mean calculation using the accumulator uses up to 8 clocks to achieve desirable system processing speed.

The mean pixel replacement block 616 is used to determine whether the pixel of interest is to be replaced by the mean pixel. This block may contain, for example, a register that is programmed from an external DSP through the DSP interface 618 to provide a threshold for determining if the pixel of interest is to be replaced (Sigma pixel threshold). The value that is compared to this threshold is the actual absolute value of the difference of the mean value and the value of the pixel of interest. If the value of the pixel of interest is further from the mean than the programmed threshold, then the pixel of interest is replaced by the mean value of the neighboring pixels. The comparison of the mean value of the neighboring pixels and the pixel of interest may be performed with a simple eight-bit comparator having a single pipeline.

Image frame stores are a key element in many video signal processing systems. The main objective of a frame store is to provide a means to store large amounts of video image data and then be able to access this image or random portions of this image as blocks of data. Accessing the image in blocks of interest is typically called region of interest (ROI) accesses. These accesses typically require accesses to the DRAM to be less than the full-page width of the DRAM (1K bytes).

Figure 7:
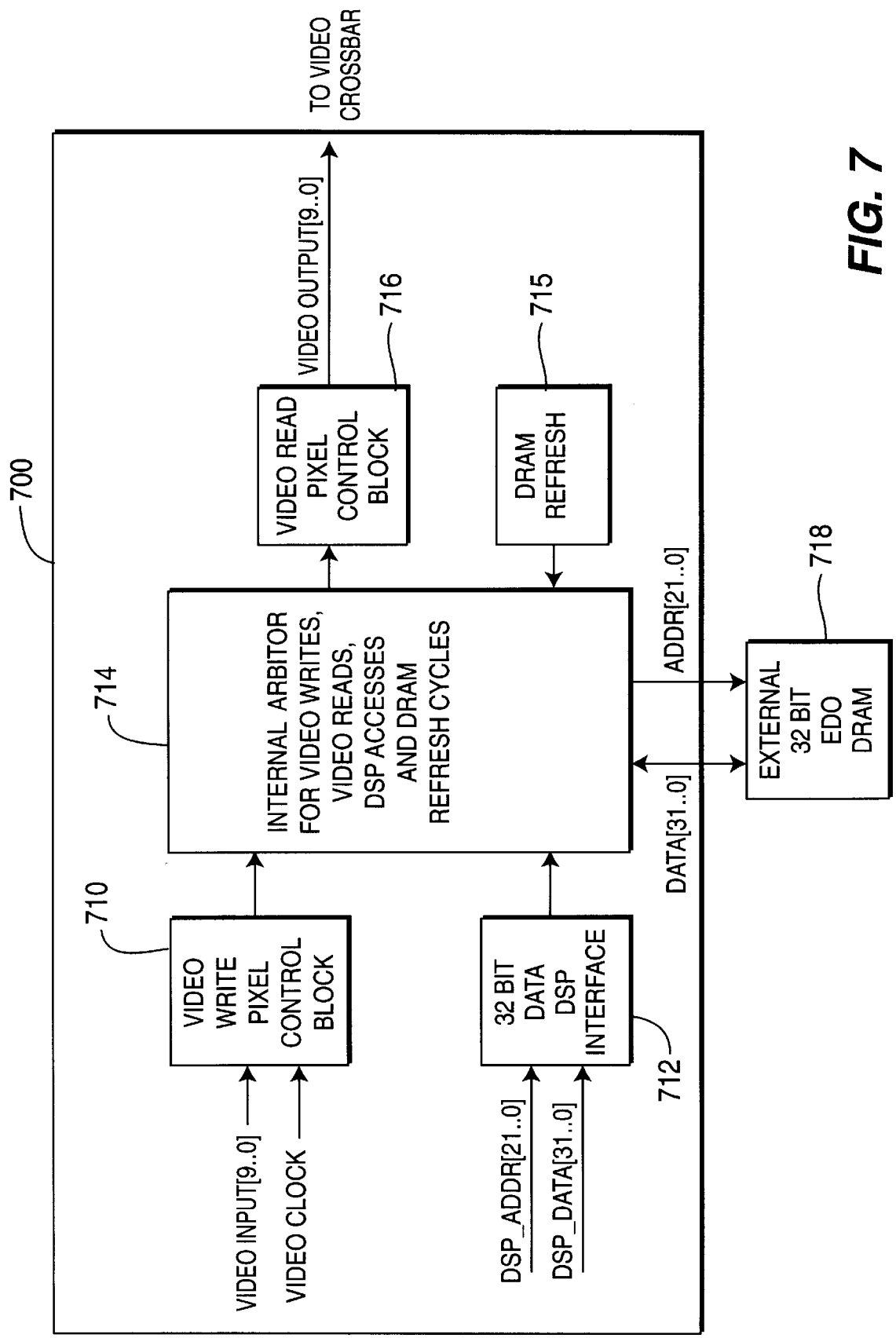
FIG. 7 is a block diagram of a data read write arbitrator circuit implemented using the FPGA signal processor shown in FIGS. 4 and 5.
Figure 8:
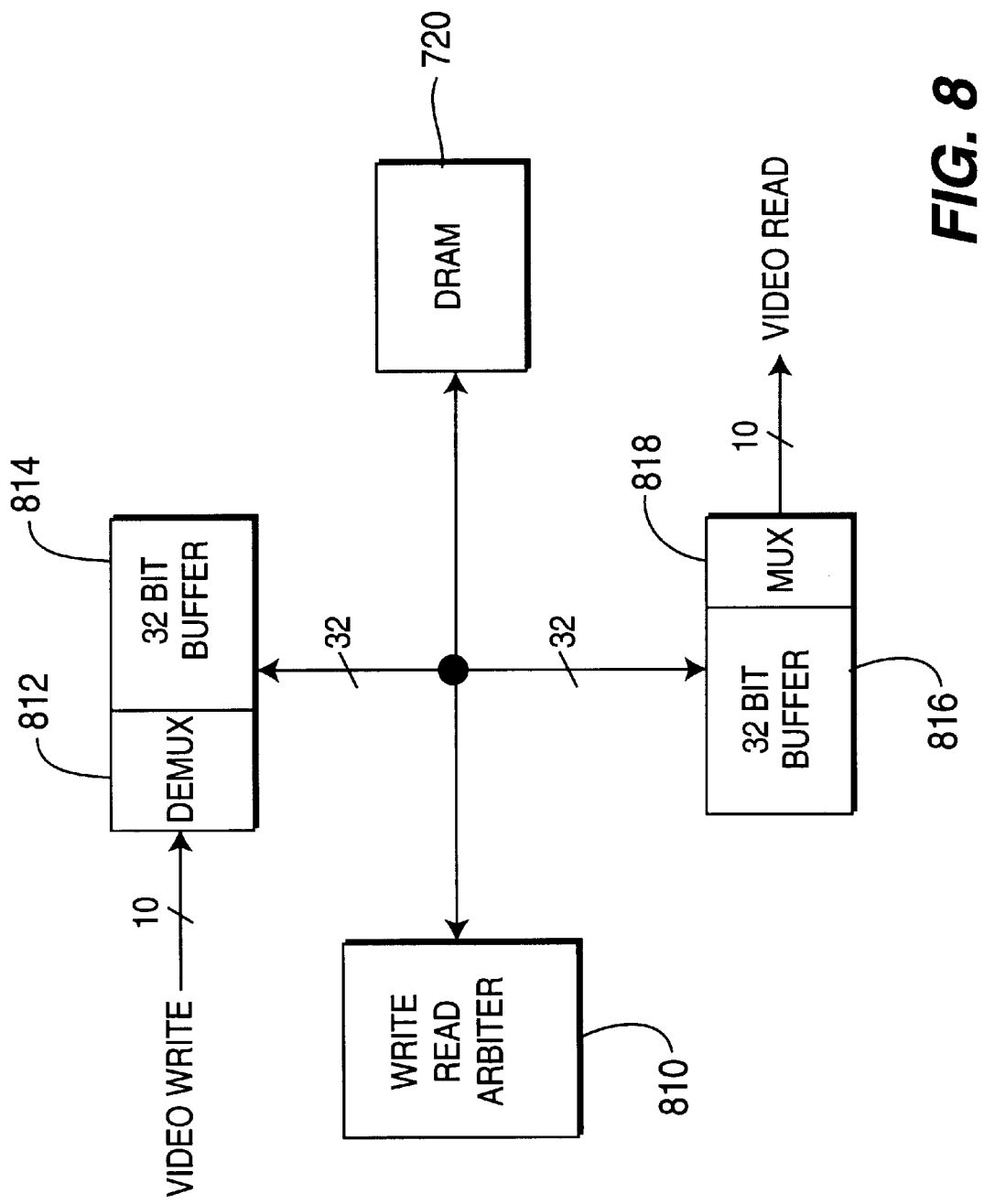
FIG. 8 is a block diagram which illustrates details of the read write arbitrator shown in FIG. 7.

Unlike previous designs, the image frame store shown in FIGS. 7 and 8 is based on an Altera FPGA 700 with the DRAM 718 being the destination of video image data. An image frame store may be based upon several types of memory devices. These devices are typically VRAM, Graphics RAM, or DRAM with DRAM requiring a little more external control. In spite of this additional overhead, DRAM has clear density and cost benefits.

The basic design of the frame store is as a triple port device: a video input, a video output and a DSP access port. The frame store is designed to arbitrate and buffer data from any of the three sources so it does not lose any requests or data.

Currently the video processing block shown in FIGS. 4 and 5 is designed to interface with up to 4M×32 DRAM devices. The exemplary DRAM is 3.3V DRAM with 50 nS access times. It is contemplated that this DRAM design may be expanded to exist on a video processing daughterboard (VPD) of its own. By placing this design on a VPD the possibility of having DRAM with densities of at least 256M Bytes is achievable. Currently the state of the art DRAM densities by the main memory manufactures are 4M×16 bytes. In the future it is very likely that memory sizes will be 8M and 16 M×16 with the devices running at 3.3V and lower.

The DSP data interface block 712 provides the interface between a DSP and the actual memory device whether it is VRAM or in this case DRAM. At any point in time the DSP (not shown) may request access to the external frame store memory 718. When the DSP requests access to the external memory and either the video read or write processes are active then arbitration and buffering of the data occurs.

The video write data interface block 710 buffers video write data before presenting it to the internal arbiter 714 to be written to the external DRAM. As with the video read, requests for access by the DSP and DRAM refresh cycles, will first request access to the DRAM via the arbiter 714.

The video read data interface block 716 requests certain data from the DRAM frame store memory when the data is required by processing circuitry connected to the read block 716. When the video read block 716 gains access to the DRAM it reads an optimized amount of data from the DRAM 718 in accordance with the optimum single-cycle DRAM page sizes. As with the video write, DSP accesses and DRAM refresh cycles, each read operation will first request access to the DRAM via the arbiter 714.

The DRAM refresh block 715 is responsible for keeping the refresh charge within the DRAM to prevent the data from being lost. This exemplary block is not given lowest priority due to its critical timing required for DRAM refresh timing. The refresh cycle requires every row of the DRAM to be refreshed once every 64 milliseconds (mS) in the 4M×16 DRAM and once per 16 mS for each row in the 1M×16 DRAM. To insure that each row is refreshed correctly an internal timer (not shown) is triggered every 15.6 uS. Each time the timer is triggered a new row of DRAM cells is refreshed. If a DRAM block read or write is in progress then the refresh operation is performed after this transfer is complete.

In the exemplary embodiment, the frame store DRAM arbiter 714 is responsible for controlling the three external requests to the DRAM as well as the internal DRAM refresh cycles. From a priority standpoint the refresh is the most critical function and both video accesses being the next two critical functions with the DSP accesses being the least time critical. Due to the nature of DRAM several steps may be taken to optimize the access times and throughput of video data. For example, controlling the minimum image size to be stored may help in arbitration of the DRAM.

The guidelines for a triple ported frame store controller are as follows:

Given any period of time where a video write, video read, DSP access and or a DRAM refresh operation must occur then the arbiter must balance the data throughput to ensure each access is completed. The key to being able to balance these multiple operations at once is the use of 32 bit DRAM.

In FIG. 8, the General DRAM Frame Store Controller Block shows the general division of functions within the DRAM based Altera frame store. The key to being able to achieve a DRAM based frame store is to take advantage of the 32 bit data bus on the DRAM architecture. By using the 32 bit data bus size the eight bit video streams can packed to four eight bit words and then stored in an internal Altera buffer (i.e. a FIFO which is 256×32 bits deep). Altera devices contain small memory blocks (EABs) which can be used to implement the two 32-bit buffers. These EABs are 256×8 bits and four of the EABs can be grouped to provide a 256×32 bit buffer. By implementing an input and output buffer structure the read and write processes may be buffered and can then share accesses to the DRAM.

The following are some basic throughput equations used to verify that enough throughput exists within the video processing block 700 to implement a DRAM based frame store.

Assumption: For a given period (P) of time the read and write processes will require ¼ the total period of time (P) for video transfers, assuming no overhead to DRAM.

P=image throughput time

P/4 required for write process (no overhead added in)

P/4 required for read process (no overhead added in)

P/2 remains for refresh and process arbitration overhead.

The following is an example of a video write of 32 pixels into DRAM and a read of 32 pixels from DRAM to the video output at the same time assuming a 33 MHz video clock.

Total number of pixel throughput=32*30 nS=960 nS=32 clocks

Video Write to DRAM

Assume typical random access (setup for one page) to DRAM equal to 60 nS setup and 60 nS RAS=120 nS 32 write bytes/4 for 32 bit DRAM writes=32/4*30 nS=240 nS Total write clocks needed=360 nS=12 clocks Video Read from DRAM Assume typical random access (setup for one page) to DRAM equal to 60 nS setup and 60 nS RAS=120 nS 32 read bytes/4 for 32 bit DRAM reads=32/4*30 nS=240 nS Total read clocks needed=360 nS=12 clocks DRAM Refresh 4 clock cycles=120 nS Total Time consumed=840 nS which leaves 120 nS for overhead when a small 32 pixel image is used. This time does not include the 32 clocks per line set aside for video blanking. The video blanking is another slot of time that can be utilized by the hardware to account for additional overhead needs.

Figure 9A:
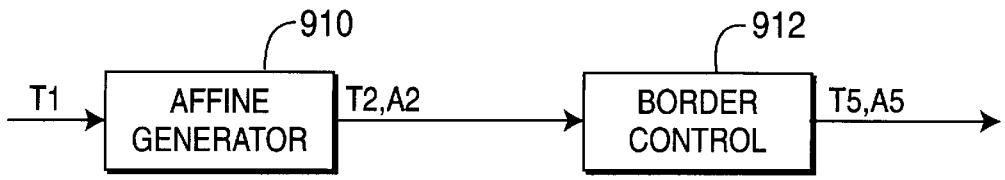
FIG. 9A is a block diagram of an affine image warper which was implemented using methods according to the present invention.

FIG. 9A is a block diagram of a portion of an image warp function. In this circuitry, only the timing signal T1 of a data input signal is provided to an affine address generator 910. As described above, the timing signals (HA and VA) define intervals during which active video information is provided in the input signals. The exemplary affine generator 910 may include, for example, a line counter representing the vertical position which is reset responsive to the signal VA and incremental responsive to the signal HA and a pixel counter representing the horizontal position which is reset responsive to the signal HA and incremental by the clock signal. These two counters provide address values for the individual pixels of the input data signal. The affine generator 910 applies an affine transformation to these address signals to generate the output signal A2 and its timing signal T2.

The parameters for the address generation function are provided by an external DSP (not shown). These parameters do not change the timing through the address generator. The affine address generator 910 uses N clock cycles to perform the address generation function and therefore the T2 timing channel is a copy of the T1 timing channel delayed by N clock periods.

The portion of the image warper shown in FIG. 9A includes a second function module, border control 912, which monitors the minimum and maximum values that can be represented by the address signal A2 and converts the address signal A2 into an address signal A5 that is sent to the remainder of the warper system. This function requires M clock periods and therefore T5 is the same as T2 but delayed by M clock periods.

Figure 9B:
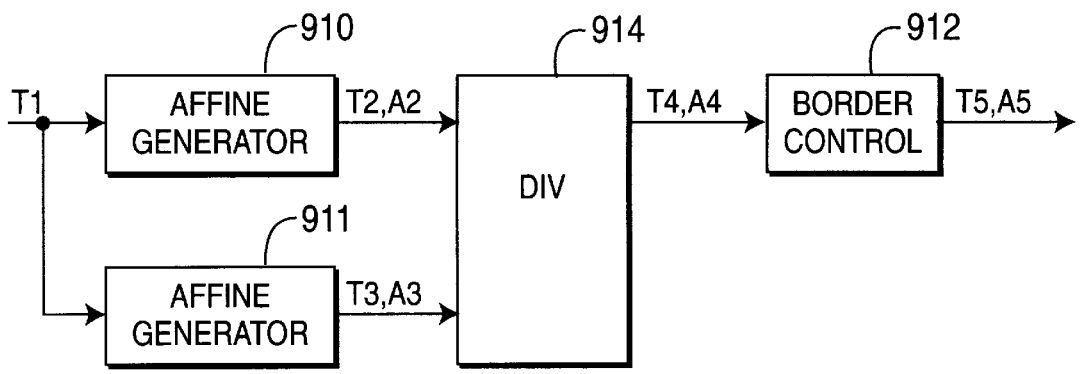
FIG. 9B is a block diagram of a modified image warper which illustrates the benefits of the design method of the present invention.

FIG. 9B illustrates how the warper functionality may be changed by modifying the address generation units. Because all data paths include timing information, a new module may be added in a data path without affecting the control or other functions of the warper design, even though the actual implementation of the new module may add additional clock pipeline delay. In the circuitry shown in FIG. 9B, a divider 914 is added to the image warper which divides the result of two address generation units. For this implementation, a simple copy of the first affine address generation unit 910 is added, as address generation unit 911, providing addresses A3 with timing T3 (which in this instance is the same as T2) to the divider 914. The output signal of the divider 914 is address signal A4 with timing signal T4. This output signal is applied to the same border control module 912. In this described example, the delay between the timing signals T5 in FIG. 9B and the timing signal T1 is greater than the timing delay of T5 with respect to T1 in FIG. 9A. Because, however, the circuitry which receives the signals T5 and A5 responds only to the timing signals T5 to determine when the address signal A5 is valid, it is immaterial which of the signals T5 is received. The only difference between the timing signals T5 produced by the circuitry shown in FIGS. 9A and 9B is the addition of the pipeline delay of the divider 914.

Figure 9C:
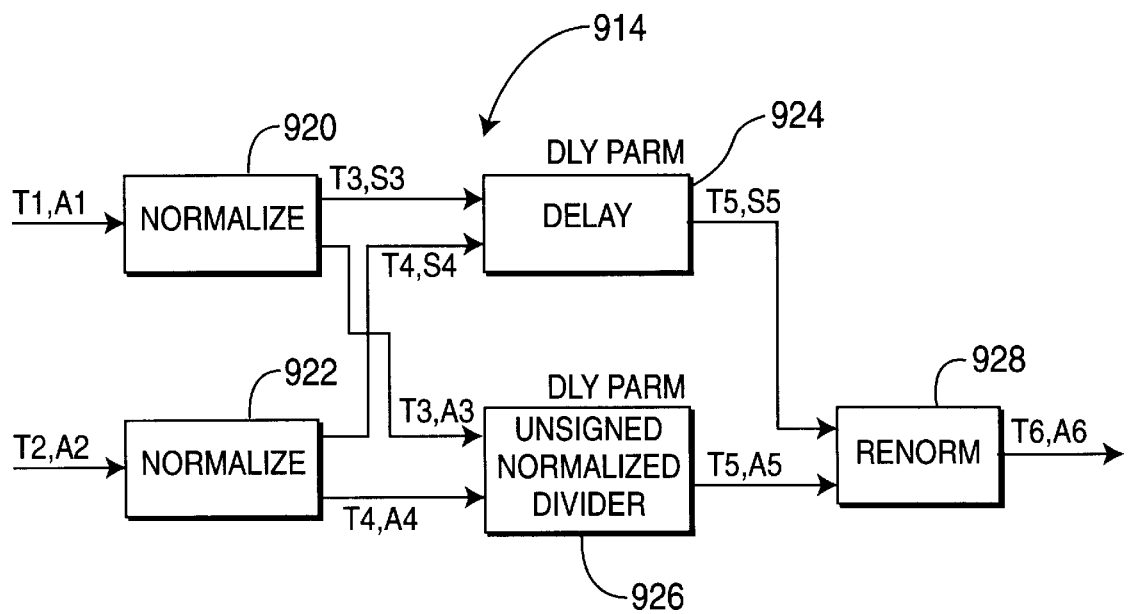
FIG. 9C is a block diagram of an exemplary divider circuit suitable for use with the image warper shown in FIG. 9B.

FIG. 9C illustrates an alternative use of the timing channel provided in accordance with the subject invention. This figure shows an exemplary implementation of the divider 914 shown in FIG. 9B. For an optimum implementation of the divider 914, an unsigned normalized divider 926 may be used. This divider assumes that data applied its input ports is unsigned and that the most significant bit is always one. To accommodate the use of a unsigned normalized divider 926, the divider circuitry 914 first normalizes the address data values A1 and A2 in normalizing circuits 920 and 922 respectively. The output signals provided by the normalizing circuits 920 and 922 are unsigned normalized values A3 and A4 and a representation of the sign and the bit-shift amount, S3 and S4, for each of the channels.

In the exemplary embodiment of the invention, the normalization operation, uses Q clock cycles. Accordingly, the timing channels T3 and T4 are the timing signals T1 and T2 delayed by Q clock periods. The divider circuitry 926 divides A3 by A4 producing the address signal A5 with a delay of P clock periods. In the delay module 924, the S3 and S4 sign and shift information provided by the normalized circuits 920 and 922 are propagated with the timing signals T3 and T4 to produce output signals T5 and S5. The signals T5, A5, and S5 are applied to a renormalization circuit 928 which shifts the output value provided by the divider 926 by a number of bits and changes the sign of the result as appropriate to reverse the normalization operation performed by the normalizing circuits 920 and 922.

The output signal provided by the exemplary divider shown in FIG. 9C is an address signal A6 and timing signal T6. These correspond to the address signal A4 and timing signal T4 shown in FIG. 9B.

As shown in FIG. 9C, the timing channel may be used for other purposes than conveying timing information. It may also be used, by merely expanding its data width, to convey other information which it is desirable to have delayed by the processing delay of a component circuit.

Figure 10A:
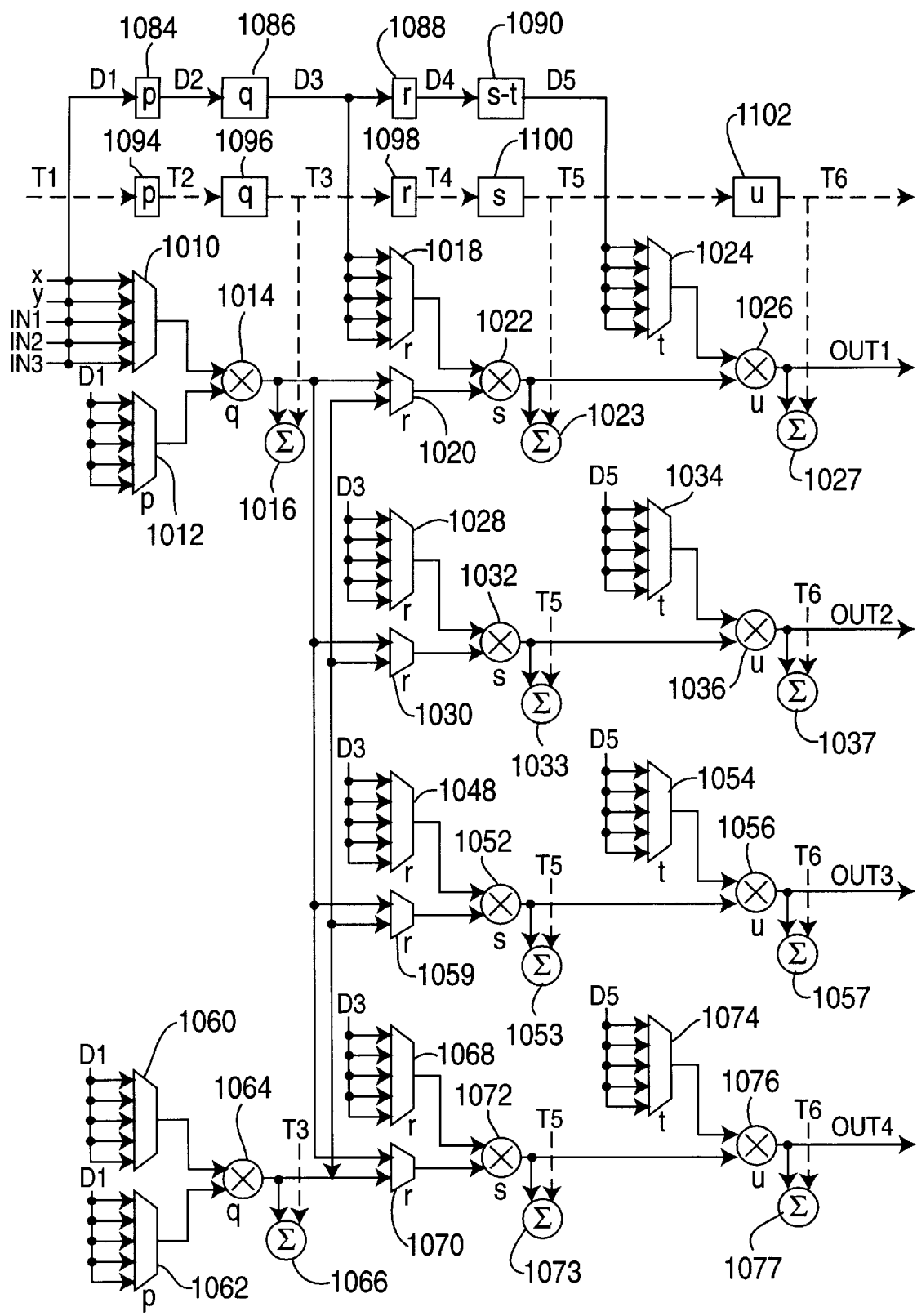
FIG. 10A is a block diagram of a programmable multiply-accumulator according to the present invention.

FIG. 10A is a block diagram of an exemplary programmable multiply-accumulator circuit which is implemented using the inventive method. In this exemplary circuit, five input signals X, Y, IN1, IN2, and IN3 are applied to respective multiplexers 1010, 1012, 1060, and 1024. The output signals of multiplexers 1010 and 1012 are applied to a multiplier 1014 which forms the products of the two output values. This output value is applied to an accumulator 1016 and to further multiplexers 1020, 1030, 1050 and 1070. Similarly, the output signals provided by the multiplexers 1060 and 1062 are applied to a multiplier 1064 which produces an output value signal which is applied to an accumulator 1066 and to the multiplexers 1020, 1030, 1050 and 1070.

The input values X, Y, IN1, IN2 and IN3 (collectively referred to as D1) are applied to a delay element 1084 which compensates for processing delay through the multiplexers 1010, 1012, 1060 and 1062 to produce the signal D2. The signal D2 is applied to a compensating delay element 1086 which compensates for the processing delay through multipliers 1014 and 1064. The output signal of the delay element 1086 is a signal D3 which is applied to multiplexers 1018, 1028, 1048 and 1068. In parallel with the delay elements 1084 and 1086, the timing signal T1 is delayed by delay elements 1094 and 1096. The output signal of delay element 1096 is a timing signal T3 which may, for example, be applied to the accumulator 1016 to enable the accumulator register (not shown) in the same manner as the enable signal shown in FIG. 3E.

The output signals of the multiplexers 1018, 1028, 1048 and 1068 are applied to a second rank of multipliers 1022, 1032, 1052 and 1072. These multipliers are coupled to receive a selected one of the signals contained in the composite signal D3 at one input port and one of output signals provided by the multipliers 1014 or 1064 at the other input port. The output signals of the multipliers 1016 and 1064 are applied to the multipliers 1022, 1032, 1052, and 1072 via the respective multiplexers 1020, 1030, 1050, and 1070.

The output signals of the multipliers 1022, 1032, 1052 and 1072 are applied to respective accumulators 1023, 1033, 1053, and 1073. These output signals are also applied to one input port of a third rank of multipliers 1026, 1036, 1056, and 1076 respectively. The signal D3 is delayed by delay elements 1088 and 1090 to produce a signal D5 which is delayed to compensate for the processing delay of multiplexers 1018, 1028, 1048 and 1068 and through multipliers 1022, 1032, 1052 and 1072. The output signals of delay element 1090 are the signals D5 which are applied to multiplexers 1024, 1034, 1054 and 1074.

In parallel with the delay elements 1088 and 1090 are delay elements 1098 and 1100. These delay elements delay the timing signal T3 provided by delay element 1096 to produce a timing signal T5 which is applied to the respective accumulators 1023, 1033, 1053 and 1073. As set forth above, the timing signal T5 may be used to enable the accumulator register when valid data is provided by multipliers 1022, 1032, 1052, and 1072.

Selected ones of the delayed signals X, Y, IN1, IN2, and IN3 provided as a composite signal D5 are applied, by the respective multiplexers 1024, 1034, 1054, and 1074, to a second input port of respective multipliers 1026, 1036, 1056 and 1076. The output signals of these multipliers are respective output signals OUT1, OUT2, OUT3 and OUT4 of the programmable multiply-accumulator circuit. The output signals of the multipliers 1026, 1036, 1056, and 1076 are also applied to accumulators 1027, 1037, 1057, and 1077 respectively. These accumulators are also coupled to received a delayed timing signal T6 from delay element 1102, which is compensated for processing delays through multiplexers 1024, 1034, 1054 and 1074 and multipliers 1026, 1036, 1056, and 1076.

The programmable multiply accumulator shown in FIG. 10A may be used to form four products, each containing four factors, simultaneously. In addition, the computation of these factors may be pipelined such that successive groups of four products may be provided with a delay that is substantially equal to the pipeline delay through a single multiplier. In the circuitry shown in FIG. 10A, if a product is to be formed from fewer than four factors, one of the input signals is set to unity and is selected for the later multiplier operations. Alternatively, each multiplier may be configured with a separate unity input such that one of the input signals does not need to be used for this purpose.

Figure 10B:
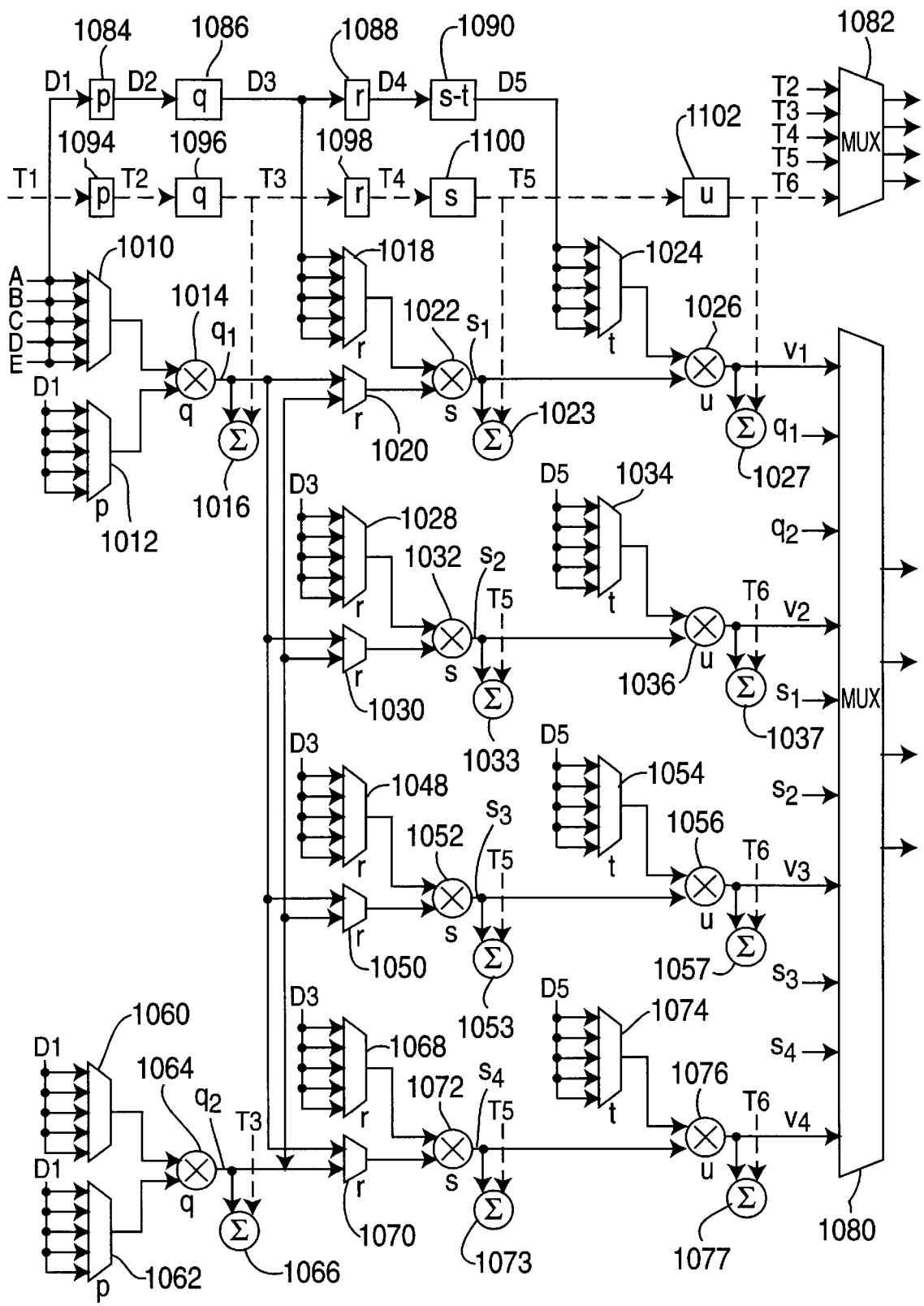
FIG. 10B is a block diagram of an enhanced programmable multiply-accumulator according to the present invention.

An alternative method for generalizing the programmable multiply-accumulator, is shown if FIG. 10B. This multiply-accumulator is configured in the same way as the circuit in FIG. 10A except that the output signal of each of the multipliers is applied to a multiplexer 1080. In addition, each of the timing signals T2, T3, T4, T5 and T6 is applied to a respectively different input port of a multiplexer 1082. Multiplexers 1080 and 1082 are controlled to select any of the applied input signals as one of the four output signals. In this manner, a product having fewer than four factors may be selected from the output port of one of the ten multipliers in the circuit and may be assigned a corresponding timing signal through the multiplexer 1082.

The programmable multiplier accumulator shown in FIG. 10A and FIG. 10B employ a single delay path for providing timing signal delay for the five input signals. In this exemplary embodiment, the five input signals are assumed to be aligned in time as they are applied to the programmable multiply-accumulator. Because of this, the timing information for all of the five signals may be conveyed by a single set of timing delay elements. If the input signals to the multiply-accumulator may not be aligned in time, it is contemplated that a five channel timing compensation module, such as that shown in FIG. 3D, may be added to the design to produce the signal D1.

One exemplary application of the circuitry shown in FIGS. 10A and 10B is in an image registration operation. Image registration is a term used to define the alignment of one image to another image such that all pixel positions are coincident. Thus, any motion between the images is removed after registration.

There are a number of different methods for performing image registration, most of which have been described in great detail in technical journals and other publications. One of the most popular (and most effective) methods for image registration is the so-called gradient-based direct method. This method uses partial spatiotemporal derivatives of the two images to compute the motion between the images, yielding a parametric transformation that registers the images. The parametric transformation is typically an affine transformation, although other parametric transformations can be easily derived using similar methods.

The transformation that is to be solved is of the following form:

$$I(x,y,t)=I(x+du,y+dv,t+1)$$

with $$du=a+bx+cy \text{ and } dv=d+ex+fy.$$

The solution for the transformation for the variables a, b, . . . , f using the direct method is as follows:

$$\begin{bmatrix} \sum I_x^2 & \sum xI_x^2 & \sum yI_x^2 & \sum I_xI_y & \sum xI_xI_y & \sum yI_xI_y \\ \sum xI_x^2 & \sum x^2I_x^2 & \sum xyI_x^2 & \sum xI_xI_y & \sum x^2I_xI_y & \sum xyI_xI_y \\ \sum yI_x^2 & \sum xyI_x^2 & \sum y^2I_x^2 & \sum yI_xI_y & \sum xyI_xI_y & \sum y^2I_xI_y \\ \sum I_xI_y & \sum xI_xI_y & \sum yI_xI_y & \sum I_y^2 & \sum xI_y^2 & \sum yI_y^2 \\ \sum xI_xI_y & \sum x^2I_xI_y & \sum xyI_xI_y & \sum xI_y^2 & \sum x^2I_y^2 & \sum xyI_y^2 \\ \sum yI_xI_y & \sum xyI_xI_y & \sum y^2I_xI_y & \sum yI_y^2 & \sum xyI_y^2 & \sum y^2I_y^2 \end{bmatrix} \begin{bmatrix} a \\ b \\ c \\ d \\ e \\ f \end{bmatrix} = \begin{bmatrix} -\sum I_xI_t \\ -\sum xI_xI_t \\ -\sum yI_xI_t \\ -\sum I_yI_t \\ -\sum xI_yI_t \\ -\sum yI_yI_t \end{bmatrix} \quad (1)$$

given that the summations are performed over the entire spatial extent of the two images.

Solving the system of equations shown in (1) is not easily performed using general-purpose processors. By far, the most computationally expensive portion of this solution is the computation for the equation coefficients through accumulation of values over the entire extent of the image. This accumulation not only involves the inspection of image pixel values over the entire image, but relies on between 2–4 multiplies and high-precision accumulation. These are operations that are not well-suited for optimized performance, even with "multimedia enhanced" processors such as the Intel Pentium MMX series of processors, or other multimedia accelerators.

Gradient-based image registration can be implemented efficiently in hardware. The computation of image partial derivatives, image pyramids, and image warping can all be implemented at rates much faster than that of standard video. The only limiting factor for the implementation of gradient-based registration, in terms of computational time, is the estimation of the coefficients in (1).

The desired coefficients in (1) are all functions of the following image/data values:

$I_x$, the partial derivative of the input image in the horizontal direction $I_y$, the partial derivative of the input image in the vertical direction $I_t$, the difference between the two images to be registered x, the horizontal position counter y, the vertical position counter The three image partial derivatives, $I_x$, $I_y$ and $I_t$ are computed by performing convolution of the source images with kernels approximating the desired derivatives. An ASIC such as the PYR-2 is suitable for this purpose. The horizontal and vertical position counters x and y, may be generated as described above with reference to FIG. 9 through analysis of the input video timing signals that accompany the video data.

All of these inputs are assumed to be fixed-point numbers with 8 bits of precision. All of the inputs are also assumed to be in signed, two's complement format.

The coefficient computation may be implemented by applying the signals x, y, $I_x$, $I_y$ and $I_t$ as the signals x, y, In1, In2 and In3, to the programmable multiply-accumulator shown in FIG. 10A or 10B. For all of the stages of the coefficient computation, one of the five 8-bit inputs is selected through a multiplexer. This selection is under software control through the use of programmable control registers.

The programmable multiply accumulator shown in FIG. 10A or 10B, can compute the coefficients shown in equation (1) with four image passes. For each pass, the input images to the multiply-accumulator are $I_x$, $I_y$ and $I_t$. The coefficients computed with each pass are shown below:

Pass 1: $\Sigma I_x^2$, $\Sigma xI_x^2$, $\Sigma yI_x^2$, $\Sigma x^2I_x^2$, $\Sigma xyI_x^2$, $\Sigma y^2I_x^2$
Pass 1: $\Sigma I_y^2$, $\Sigma xI_y^2$, $\Sigma yI_y^2$, $\Sigma x^2I_y^2$, $\Sigma xyI_y^2$, $\Sigma y^2I_y^2$
Pass 3: $\Sigma I_xI_y$, $\Sigma xI_xI_y$, $\Sigma yI_xI_y$, $\Sigma x^2I_xI_y$, $\Sigma y^2I_xI_y$, $\Sigma xyI_xI_y$
Pass 4: $\Sigma I_xI_t$, $\Sigma I_yI_t$, $\Sigma xI_xI_t$, $\Sigma xI_yI_t$, $\Sigma yI_xI_t$, $\Sigma yI_yI_t$ Given that the multiply accumulator, in its first intended implementation, processes pixels at a 33 MHz rate, the following execution time can be computed for each pass:

time/pass=(hor_size+32) (vert_size+2)*30 nsec+250 psec

This relationship reflects a horizontal blanking time of 32 pixels, a vertical blanking time of 2 lines, and 250 psec for control register setup. Using this relationship, the coefficients for a 256×256 pixel size pair of images can be computed in 8 msec. Likewise, a 128×128 pixel sized pair of images yields a execution time of 2.5 msec and a 64×64 pixel sized pair of images yields an execution time of 1.8 msec.

Figure 11:
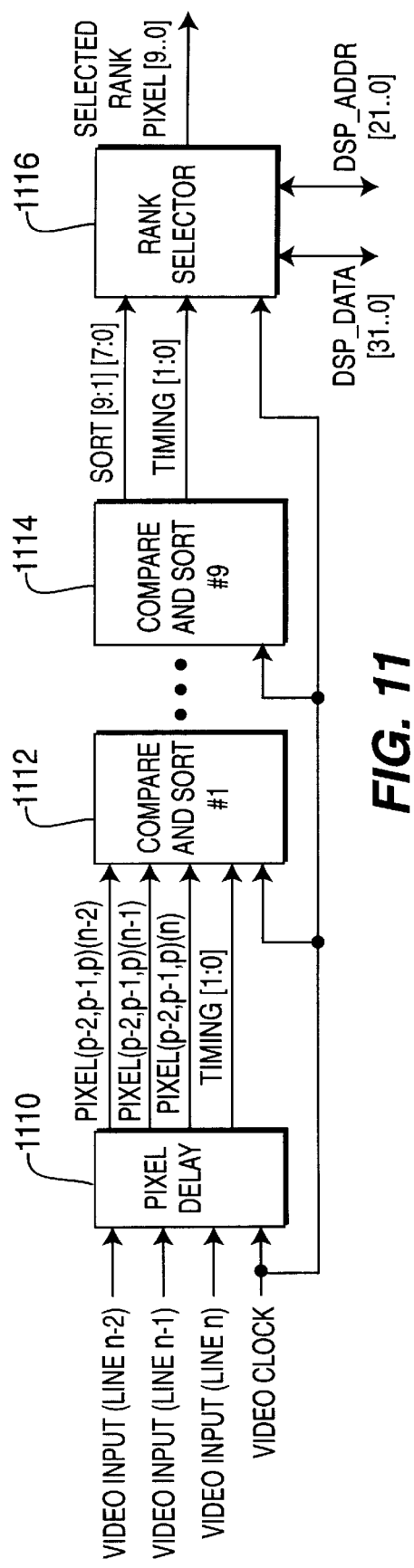
FIG. 11 is a block diagram of an exemplary rank filter implemented using the FPGA signal processor shown in FIGS. 4 and 5.

The video processing block shown in FIGS. 4 and 5 may also be used to implement a 3×3 Pixel Rank Filter as shown in FIG. 11. The main goal of the rank filter is to allow for filtering a given pixel against eight of its neighboring pixels. A 3×3 pixel rank filter will operate on pixel data consisting of nine pixel samples. The nine samples are from three separate lines (current line and two previous lines), with three pixels from the same location in their respective lines.

The rank filter has numerous possible uses within video processing systems. Since the rank filter sorts the nine pixels of interest from minimum to maximum a real time selection of the pixel of interest can be made. Any of the nine-pixel values can programmed to come out of the FPGA during a field of data with a typical value of the center pixel of the sort commonly used. The center pixel of the sort provides the median of each 3×3 pixel image.

FIG. 11 illustrates an exemplary implementation of a programmable rank filter that operates on a 3×3 pixel set from an image input at the video clock rate. Below are descriptions of each of the component blocks.

The input pixel delay block 1110 is used to delay and generate two additional pixels from each line. This block receives three pixel data streams, one from the current line and each other from the two previous lines of image data. From these three pixel line streams the circuitry shown in FIG. 11 can perform the required rank filter operation.

The comparator and sort blocks 1112 through 1114 are used to sort the nine-pixel values in ascending value. To sort the nine pixels the sort routine is pipelined with nine additional clocks. Overall, the few additional internal pipelines within the FPGA do not seriously affect performance. The output signal provided by the ninth pixel compare and sort circuit 114 is an array of nine pixels sorted in ascending order.

Prior to performing a rank filter operation an internal FPGA register is initialized to select one of the 9 sorted pixel values, in effect selecting the rank filter operation.

Figure 12:
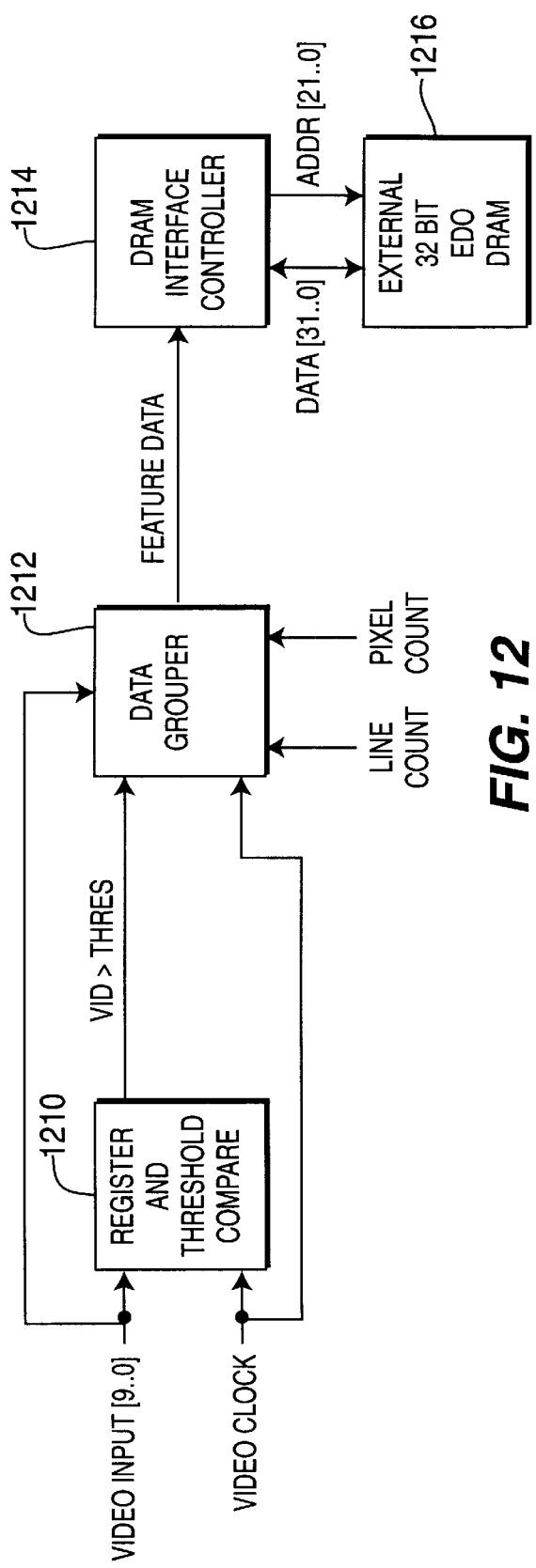
FIG. 12 is a block diagram of an exemplary feature extractor implemented using the FPGA signal processor shown in FIGS. 4 and 5.

The device shown in FIG. 12 illustrates the implementation of a feature extractor. The main objective of the feature extractor is to identify pixel locations within an image that exceed a programmed value. A threshold block 1210 contains a register (not shown) that holds the value to which all incoming image pixel values are compared. When a pixel exceeds the threshold (0 to 255 possible for eight bit data), a trigger is sent to the next control block to enable storing the location and value of the pixel. The purpose of storing the location of the pixel that exceeded the threshold is to be able to use this information to identify the location of an object(s) within an image for detection or object tracking applications.

An extension of the single-pass image feature extractor is the implementation of a connected component algorithm. Through the use of the feature-extracted data and group identity image data the feature data can be grouped to provide a collection of blobs rather than single pixel data. The additional piece of information needed for this analysis is the indication of a group number. Assuming that over an image no more than 256 actual blobs (groups) would occur, then each pass through a line a group value may be attached to the location pixel data. The group value allows for grouping the blobs over the image. This section describes the implementation of the feature extractor and an extension into the connected component algorithm.

The programmable threshold block 1210 contains a register that holds the value to which all incoming image pixel values are compared. Prior to passing an image through the feature extractor shown in FIG. 12, the DSP (not shown) programs a value into the threshold register. After programming this value, a start signal is sent throughout the system. Responsive to this start signal and the timing signals associated with the video input, the register and compare threshold block 1210 starts comparing incoming image data with the programmed threshold value. A standard eight-bit comparator with a single pipeline can be used for this purpose. For input data that exceeds the threshold, this block provides an indication to the next block, the data grouper 1212, that a specific pixel shall have its locations marked and stored. Such a pixel is referred to as a "feature-pixel".

The data grouper block 1212 is used to keep track of where in the image a feature pixel is located. The line and pixel count values are controlled by horizontal and vertical active signals (HA and VA respectively), which accompany the eight bit pixel data throughout the image processing system. If the input image to the feature extractor were 1024 by 1024 pixels then both the line and pixel counts would be ten bits.

The data grouper 1212 may also contain circuitry which accelerates a connected component algorithm (also known as "blob" labeling). Since the connected component algorithm requires more than one video pass, additional information is required to aid this algorithm. The additional information is the group value of a feature pixel. Each feature pixel may use as many as two 32-bit word location within DRAM memory 1216. As well as the normal feature extractor data the group and the number of pixels already within this group on a row are stored in these memory locations. Feature pixels are considered to be part of one group if they are less than N pixels apart, where N can be a programmable value. In this description N is 2. As a line of image data is passed through the extractor, a count for a specific group value is stored. During processing of a line a counter is running, keeping track of the number of pixels in any one group. As long as no more than two pixels in a row are not lower than the threshold then the group count gets incremented otherwise the count stops and a new group begins with the next threshold level exceeded.

An exemplary data format for storing the feature data into the DRAM 1216 is as follows:

Word one (32 bits):
  12 bit "pixel #" location of pixel that exceeds threshold
  12 bit "row #" location of pixel that exceeds threshold
  8 bit value of specific pixel that exceeded the threshold Word two (32 bits):
  10 bit group number of pixel that exceeded the threshold data
  10 bit "number of pixels" within the current group (i.e. the cumulative count of the number of pixels in the group a specific pixel falls into.

Another set of data that is used to perform the connected component algorithm is a table of the groups and an indication of the line on which these groups occurred on. By knowing the group and the line number the next step of the algorithm can connect these groups. The group number and the line may either be stored in an internal Altera EAB, or at another location in DRAM if a larger number of groups are required.

For the connected component algorithm implementation each pixel that exceeds the threshold has these two words written into DRAM. Connected components require a multi-pass algorithm due to the need to group pixels over multiple lines. During the first pass of the algorithm the groups are identified on a per line basis. The algorithm will continue a group on a specific line as long as no more than a two pixels (value of two may be programmable) in a row do not exceed the threshold.

The result of the first pass of the image within the connected component algorithm results in a list of pixels that exceed the threshold with the group identifier for each pixel that does not cross the line boundary.

The next pass of the connected component algorithm is to connect the groups of pixels across lines using the pixel and row locations stored in the first word of the feature extraction data for each pixel. By comparing the location of the feature pixels that exceed the thresholds along with their group identifier the connection of groups across lines can be made.

To perform the image connection across lines a second pass algorithm is performed on the data that has been stored in DRAM for each pixel that exceeded the threshold. By reading out the groups that exceeded the threshold for a given line, the locations can be compared to the previous and next lines. Using the information in the table of line numbers and groups the connection table of the groups can be generated. The final result of the second pass algorithm is a table which connects each of the groups previously broken up per line. The connected group table is then readable by the DSP to determine which groups are of interest for additional analysis.

Word one of the data is always used for feature extractor data while word two may or may not be used.

The feature extractor DRAM control interface 1214 provides the means for storing the pixel location and value that exceed the pre-specified value. This interface is designed to buffer data from the feature threshold block 1210 and perform writes to external DRAM 1216 while also performing the required DRAM refresh cycles. This control interface consists of a FIFO that acts as a buffer between the threshold block and the DRAM. When a threshold is exceeded the location and value of the pixel is written to the 32 bit wide DRAM. Within a 32 bit DRAM data word exists the line number and the pixel location within the corresponding line as well the 8-bit value of the pixel which exceeded the threshold.

In summary the image feature extractor can be a very useful means of determining areas within an image, which meet specific characteristics of an image. Feature extraction has numerous applications in video image processing, especially in areas of object tracking and object identification.

The feature extractor algorithm as presented here can have numerous variations. As stated in the above sections one such extension of the feature extractor is the connected components algorithm. With some additional internal control the algorithm can be implemented in a 2-pass configuration. The first pass is the typical feature extractor algorithm with the storing of line groups added. The second pass for the connected component algorithm is the development of a connected group table for individual line groups collected in the first pass. The timing signals at the input are used to control the processing of only active data of a full image or frame during the first pass. The second pass starts when the timing signals indicate the end of the first pass and may use internal generated timing in the second pass.

After the connected component table is created the DSP can use this information to calculate such things as the centroids of individual groups, "blobs".

Figure 13:
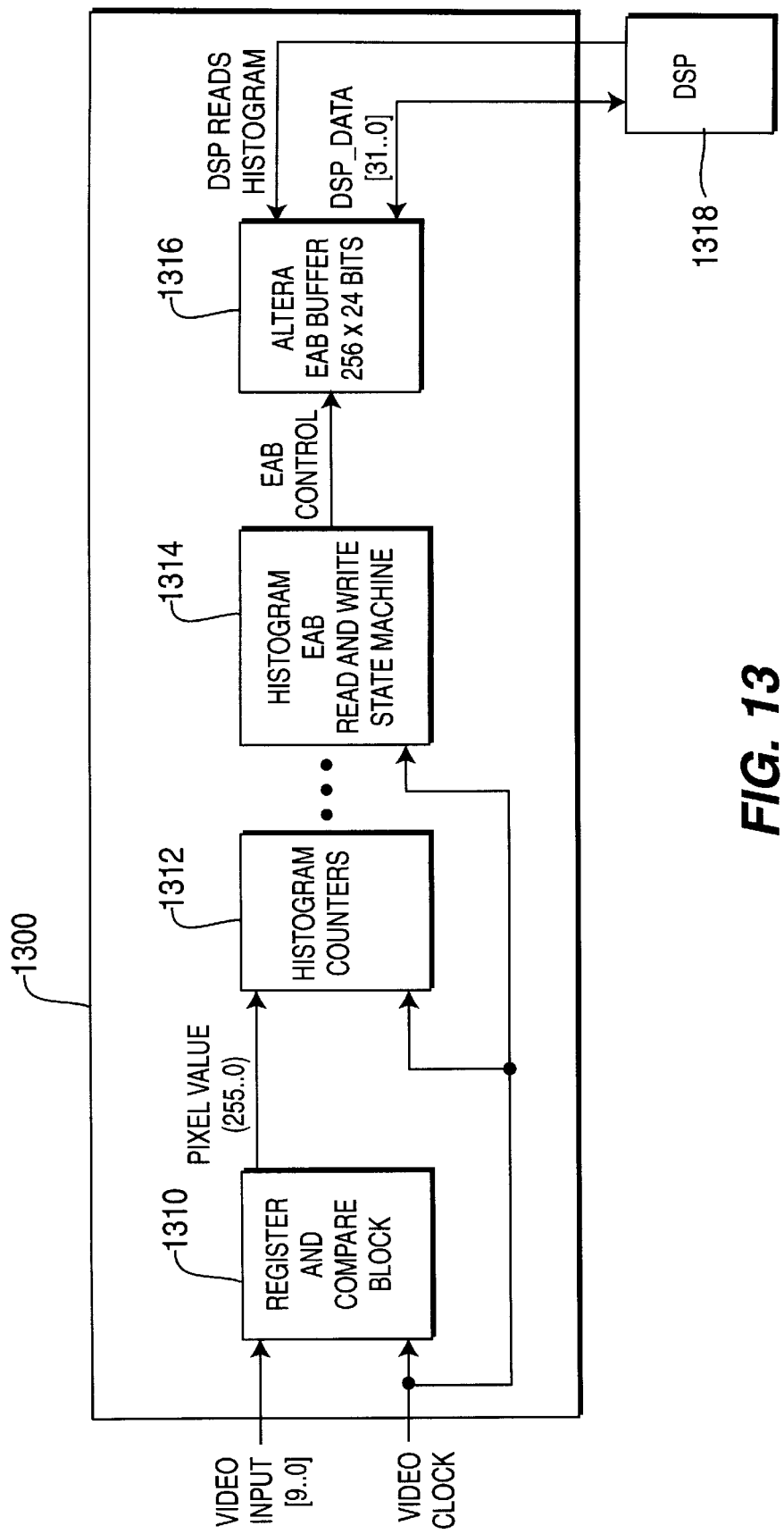
FIG. 13 is a block diagram of an exemplary histogram processor implemented using the FPGA signal processor shown in FIGS. 4 and 5.

FIG. 13 illustrates an implementation scheme for a 256-grayscale histogrammer. The implementation above is achieved without the need for the external DRAM. Rather than using the external DRAM this algorithm takes advantage of the internal EABs in the FLEX 10K family of Altera parts. This design will fit into a FLEX 10K50 device but with some optimization the design may fir into a FLEX 10K30 device.

The first block in the histogrammer 1300 is the register and compare block 1310. This block registers the data and then enables one of the 256 counters in the next block. The data coming into this block is at a rate of 33 MHz.

The histogram counter blocks 1312 are designed to keep track of the counts of each of the pixel values entering the histogrammer. This block is used to provide a timing buffer between the pixel value and the writing of the pixel counts to the internal Altera memory blocks (EAB's) 1316. This block counts up to 16 pixel counts at which point a secondary counter is triggered. The secondary counter is the mechanism that triggers the histogram read and write state machine 1314.

The histogram read and write state machine 1314 runs independently while the image pixel counts are being generated. This block monitors the counters in the previous blocks and increments the pixel count values within the Altera EABs 1316 accordingly.

The implementation of a histogrammer as described in the above figure can be accomplished without the need for external memory. The key to achieving the real time speeds with this design is to have a few independent processes operating on the data in parallel. For this implementation two main processes are running with only minimal interaction. To speed up the interface from the actual pixel count values to the histogram memory a small micro controller 1314 is implemented within the Altera logic. The function of the microcontroller is to monitor the pixel counters and when a certain number of pixel counts for a specific pixel value is reached then the controller increments the Altera EAB memory location for that given pixel value by the identical number of pixels recorded by the counter.

By having a separate read and write pixel counter micro controller 1314 running the pixel input data can be processed at full clock rate and image expansion will not be required. Image expansion is a way to reduce the data rate of an image by reading it out of an image frame store at half the normal image rate. To read out at half the image rate every pixel is repeated once. This is known as double expansion. By reducing the image data rate the amount of time available to process the image increases in effect allowing for slower algorithms and/or hardware devices. Currently none of the algorithms require image expansion but, for future design the capability exists.

While the invention has been described in terms of exemplary embodiments, it is contemplated that it may be practiced as outlined above within the scope of the attached claims.

What is claimed is:

1. A method of implementing digital signal processing circuitry including the steps of:

identifying a plurality of multi-component constructs to be used to process the digital signals, each of the plurality of multi-component constructs having a processing delay;

modifying a plurality of the identified constructs to include a channel for conveying a timing signal to define a plurality of auxiliary multi-component constructs, wherein the timing channel of each of auxiliary multi-component constructs delays the timing signal by an amount of time substantially equal to the processing delay of the corresponding multi-component construct; wherein, ones of the identified multi-component constructs, that do not change values of the processed digital signals, modify the multi-component constructs by adding a path through the respective multi-component constructs that processes the timing signal in parallel with the digital signal that is being processed;

defining the digital signal processing circuitry using the plurality of multi-component constructs; and replacing selected ones of the assembled multi-component constructs with corresponding ones of the auxiliary multi-component constructs to define circuitry which propagates a timing signal through the digital signal processing circuitry.

2. A method according to claim 1, wherein, for ones of the identified multi-component constructs that change values of the processed digital signals, the step of modifying the multi-component constructs includes adding a delay path to the multi-component constructs, the delay path providing a delay which compensates for a processing delay of the multi-component construct in processing the digital signals.

3. A method according to claim 1, further including the step of inserting, in the assembled multi-component constructs, data alignment circuitry, the data alignment circuitry being responsive to a plurality of digital data signals and a respective plurality of timing signals to align the plurality of digital data signals in time as determined by the respective timing signals.

4. A method according to claim 3, wherein each timing signal indicates when its respective digital data signal is valid and the data alignment circuitry performs the steps of:

storing data for each data signal having a respective timing signal which indicates that the data signal is valid;

providing stored digital data signals only when all of the plurality of timing signals indicate that their respective data signals are valid.

5. A configurable arithmetic and logic unit comprising:

first and second input ports for receiving first and second digital data signals, each of the first and second digital data signals including a data portion and a timing portion;

a data alignment circuit responsive to the timing portions of the first and second digital data signals and to a timing control signal for aligning the first and second digital data signals;

a look up table responsive to a programming control signal and to the data portion of at least one of the first and second digital data signals as an address value for producing an output data signal determined by the programming control signal, a timing path, coupled in parallel with the look-up table, for delaying the timing portion of the digital data signals to match a processing delay through the look-up table; and a control port for receiving the timing control signal and the program control signal from an external controller.

6. A configurable arithmetic and logic unit according to claim 5, further comprising an accumulator coupled to receive digital values representing at least one of the first and second digital data signals and the output data signal for accumulating a sum of the received digital values.

7. A configurable arithmetic and logic unit according to claim 5, further comprising timing signal selection means including:

means for generating a logical AND of respective timing portions of the first and second digital data signals;

means for generating a logical OR of respective timing portions of the first and second digital data signals; and means for selecting from among the timing portion of the first digital data signal, the timing portion of the second digital data signal, the logical AND of the timing portions of the first and second digital data signals and the logical OR of the timing components of the first and second digital data signals to provide an output timing signal from the configurable arithmetic and logic unit.

8. A programmable digital signal processing circuit comprising:

a first multiplexer, coupled to receive a plurality of digital data signals, at least one of the plurality of digital data signals including a timing signal component, and responsive to a first control signal, to provide a selected one of the digital data signals as an output signal;

a second multiplexer, coupled to receive the plurality of digital data signals and responsive to a second control signal, to provide a selected one of the digital data signals as an output signal;

a first multiplier coupled to multiply the output signal of the first multiplexer by the output signal of the second multiplexer to provide an output signal;

a third multiplexer, coupled to receive the plurality of digital data signals and responsive to a third control signal, to provide a selected one of the digital data signals as an output signal;

a second multiplier coupled to multiply the output signal of the first multiplier by the output signal of the third multiplexer to provide an output signal;

a timing channel for delaying the timing signal component to compensate for processing delays through one of the first and second multiplexers, the first and second multipliers and the third multiplexer to provide a timing output signal which corresponds to the output signal of the second multiplier; and a control port for receiving the first, second and third control signals from an external controller.

9. A programmable digital signal processor according to claim 8, further comprising:

a first accumulator, coupled to accumulate a sum of successive values of the output signal of the first multiplier; and a second accumulator, coupled to accumulate a sum of successive values of the output signal of the second multiplier;

wherein, the second accumulator is responsive to the timing output signal to enable the accumulation of the sum of successive values of the output signal of the second multiplier.

* * * * *